United States Patent
Kassner

(10) Patent No.: US 12,353,617 B2
(45) Date of Patent: Jul. 8, 2025

(54) SYSTEMS AND METHODS FOR DETERMINING ONE OR MORE PARAMETERS OF A USER'S EYE

(71) Applicant: PUPIL LABS GmbH, Berlin (DE)

(72) Inventor: Moritz Kassner, Berlin (DE)

(73) Assignee: Pupil Labs GmbH, Berlin (DE)

( * ) Notice: Subject to any disclaimer, the term of this patent is extended or adjusted under 35 U.S.C. 154(b) by 493 days.

(21) Appl. No.: 17/620,004

(22) PCT Filed: Jun. 18, 2019

(86) PCT No.: PCT/EP2019/066043
§ 371 (c)(1),
(2) Date: Dec. 16, 2021

(87) PCT Pub. No.: WO2020/253949
PCT Pub. Date: Dec. 24, 2020

(65) Prior Publication Data
US 2022/0198789 A1      Jun. 23, 2022

(51) Int. Cl.
*G06V 10/82*   (2022.01)
*G02B 27/01*   (2006.01)
(Continued)

(52) U.S. Cl.
CPC ........... *G06F 3/013* (2013.01); *G02B 27/017* (2013.01); *G06V 10/82* (2022.01); *G06V 40/19* (2022.01); *G02B 2027/0178* (2013.01)

(58) Field of Classification Search
CPC ........ G06F 3/013; G06V 10/82; G06V 40/19; G02B 27/017; G02B 2027/0178
See application file for complete search history.

(56) References Cited

U.S. PATENT DOCUMENTS

| | | | |
|---|---|---|---|
| 4,852,988 A | * | 8/1989 | Velez ...................... A61B 3/113 351/158 |
| 6,091,546 A | | 7/2000 | Spitzer |

(Continued)

FOREIGN PATENT DOCUMENTS

| | | |
|---|---|---|
| CA | 2967756 | 10/2005 |
| CA | 2750287 | 11/2011 |

(Continued)

OTHER PUBLICATIONS

Notice of Allowance dated Mar. 30, 2022 in U.S. Appl. No. 16/967,304.
(Continued)

*Primary Examiner* — Syed Haider
(74) *Attorney, Agent, or Firm* — Dicke, Billig & Czaja, PLLC

(57) ABSTRACT

A system and method for determining one or more parameters of a user's eye is disclosed. In one example, the system includes a computing unit and a head-wearable device including a first camera having a field of view, and a non-transparent component. The first camera and the non-transparent component are arranged relative to each other so that at least a portion of the eye and at least a portion of the non-transparent component are expected to be in the field of view of the first camera. The computing unit implements a neural network and is configured to receive an image from the first camera, feed the image as an input into the neural network, and determine the one or more parameters as an output of the neural network.

22 Claims, 3 Drawing Sheets

(51) Int. Cl.
*G06F 3/01* (2006.01)
*G06V 40/19* (2022.01)

(56) References Cited

U.S. PATENT DOCUMENTS

| | | | |
|---|---|---|---|
| 6,351,273 B1 | 2/2002 | Lemelson et al. | |
| 6,943,754 B2 | 9/2005 | Aughey et al. | |
| 7,488,294 B2 | 2/2009 | Torch | |
| 7,815,311 B2 | 10/2010 | Johns et al. | |
| 8,342,687 B2 | 1/2013 | Blixt et al. | |
| 8,594,374 B1 | 11/2013 | Bozarth | |
| 8,624,994 B2 | 1/2014 | Kaneda et al. | |
| 8,752,963 B2 | 6/2014 | McCulloch et al. | |
| 8,761,459 B2 | 6/2014 | Kaneda et al. | |
| 8,830,142 B1 | 9/2014 | Kim et al. | |
| 8,836,768 B1 | 9/2014 | Rafii et al. | |
| 8,929,589 B2 | 1/2015 | Publicover et al. | |
| 8,982,046 B2 | 3/2015 | Edwards et al. | |
| 9,185,352 B1 | 11/2015 | Jacques | |
| 9,189,095 B2 | 11/2015 | Eden et al. | |
| 9,207,760 B1 | 12/2015 | Wu et al. | |
| 9,253,442 B1 | 2/2016 | Pauli | |
| 9,380,287 B2 | 6/2016 | Nistico et al. | |
| 9,405,365 B2 | 8/2016 | Publicover et al. | |
| 9,451,166 B1 | 9/2016 | Ribardo, Jr. et al. | |
| 9,501,683 B1 | 11/2016 | Hatstat et al. | |
| 9,529,442 B2 | 12/2016 | Cho et al. | |
| 9,600,069 B2 | 3/2017 | Publicover et al. | |
| 9,668,648 B2 | 6/2017 | Pfleger et al. | |
| 9,672,416 B2 | 6/2017 | Zhang et al. | |
| 9,693,684 B2 | 7/2017 | Lopez et al. | |
| 9,727,136 B2 | 8/2017 | Willairat et al. | |
| 9,737,209 B2 | 8/2017 | Gramatikov et al. | |
| 9,785,233 B2 | 10/2017 | San Agustin Lopez et al. | |
| 9,801,539 B2 | 10/2017 | Kerr et al. | |
| 9,811,158 B2 | 11/2017 | Hennessey et al. | |
| 9,851,091 B2 | 12/2017 | Im et al. | |
| 9,936,195 B2 | 4/2018 | Horesh | |
| 9,958,941 B2 | 5/2018 | Gustafsson et al. | |
| 9,961,307 B1 | 5/2018 | Weinblatt | |
| 9,977,960 B2 | 5/2018 | Gustafsson et al. | |
| 10,016,131 B2 | 7/2018 | Liu et al. | |
| 10,048,749 B2 | 8/2018 | Miao et al. | |
| 10,114,459 B2 | 10/2018 | Algotsson et al. | |
| 10,157,313 B1 | 12/2018 | Zhang et al. | |
| 10,229,511 B2 | 3/2019 | Meier | |
| 10,285,589 B2 | 5/2019 | Hart et al. | |
| 10,303,250 B2 | 5/2019 | Jeong | |
| 10,307,053 B2 | 6/2019 | Fayolle | |
| 10,416,764 B2 | 9/2019 | Wanner et al. | |
| 10,438,373 B2 | 10/2019 | Wang et al. | |
| 10,452,137 B2 | 10/2019 | Noda et al. | |
| 10,488,668 B2 | 11/2019 | Cazalet | |
| 10,489,680 B2 | 11/2019 | Aliabadi et al. | |
| 10,496,160 B2 | 12/2019 | Lu et al. | |
| 10,514,542 B2 | 12/2019 | Erinjippurath et al. | |
| 10,546,193 B2 | 1/2020 | Schmidt et al. | |
| 10,546,194 B2 | 1/2020 | Tsurumi | |
| 10,634,934 B2 | 4/2020 | Chene et al. | |
| 10,698,205 B2 | 6/2020 | Huang | |
| 10,909,711 B2 | 2/2021 | Schroeder et al. | |
| 10,976,813 B2 | 4/2021 | Nistico et al. | |
| 11,017,558 B2 | 5/2021 | Noble et al. | |
| 11,023,038 B2 | 6/2021 | Yasuda et al. | |
| 11,033,204 B2 | 6/2021 | Massonneau et al. | |
| 2003/0184868 A1 | 10/2003 | Geist | |
| 2004/0174496 A1 | 9/2004 | Ji et al. | |
| 2005/0034287 A1 | 2/2005 | Xie | |
| 2005/0225723 A1 | 10/2005 | Pilu | |
| 2006/0240005 A1 | 10/2006 | Velardi | |
| 2006/0279692 A1 | 12/2006 | Bruck | |
| 2007/0066916 A1 | 3/2007 | Lemos | |
| 2009/0018419 A1* | 1/2009 | Torch | A61B 3/112 348/78 |
| 2009/0190026 A1 | 7/2009 | Chen | |
| 2010/0045933 A1 | 2/2010 | Eberl et al. | |
| 2010/0053555 A1 | 3/2010 | Enriquez et al. | |
| 2010/0220288 A1 | 9/2010 | Cleveland | |
| 2012/0212593 A1 | 8/2012 | Na'aman et al. | |
| 2012/0290401 A1 | 11/2012 | Neven | |
| 2012/0293773 A1 | 11/2012 | Publicover et al. | |
| 2013/0050070 A1 | 2/2013 | Lewis et al. | |
| 2013/0066213 A1 | 3/2013 | Wellington | |
| 2013/0069883 A1 | 3/2013 | Oga | |
| 2013/0083976 A1 | 4/2013 | Ragland | |
| 2013/0100025 A1 | 4/2013 | Vernacchia | |
| 2013/0114043 A1 | 5/2013 | Balan et al. | |
| 2013/0120224 A1 | 5/2013 | Cajigas et al. | |
| 2013/0207887 A1 | 8/2013 | Raffle et al. | |
| 2013/0222213 A1 | 8/2013 | Abdollahi et al. | |
| 2013/0318776 A1 | 12/2013 | Jacobs et al. | |
| 2013/0321925 A1 | 12/2013 | Jacobs et al. | |
| 2014/0022371 A1 | 1/2014 | Huang et al. | |
| 2014/0043581 A1 | 2/2014 | Chen | |
| 2014/0049452 A1 | 2/2014 | Maltz | |
| 2014/0055591 A1 | 2/2014 | Katz | |
| 2014/0055746 A1 | 2/2014 | Nistico et al. | |
| 2014/0055747 A1 | 2/2014 | Nistico et al. | |
| 2014/0152558 A1 | 6/2014 | Salter et al. | |
| 2014/0156219 A1 | 6/2014 | Soubra et al. | |
| 2014/0191927 A1 | 7/2014 | Cho | |
| 2014/0218281 A1* | 8/2014 | Amayeh | A61B 3/14 345/156 |
| 2014/0226131 A1 | 8/2014 | Lopez et al. | |
| 2014/0247232 A1 | 9/2014 | George-Svahn et al. | |
| 2014/0285404 A1 | 9/2014 | Takano et al. | |
| 2014/0354953 A1 | 12/2014 | Chen et al. | |
| 2015/0070470 A1 | 3/2015 | McMurrough | |
| 2015/0085251 A1 | 3/2015 | Larsen | |
| 2015/0169050 A1 | 6/2015 | Publicover et al. | |
| 2015/0181100 A1 | 6/2015 | Publicover et al. | |
| 2015/0302585 A1 | 10/2015 | VanBlon et al. | |
| 2015/0310263 A1 | 10/2015 | Zhang et al. | |
| 2016/0004306 A1 | 1/2016 | Maltz | |
| 2016/0005176 A1 | 1/2016 | Nguyen et al. | |
| 2016/0011658 A1 | 1/2016 | Lopez et al. | |
| 2016/0166190 A1 | 1/2016 | Publicover et al. | |
| 2016/0109945 A1 | 4/2016 | Kempinski | |
| 2016/0126675 A2 | 5/2016 | Daoura | |
| 2016/0166146 A1 | 6/2016 | Sarkar | |
| 2016/0187969 A1 | 6/2016 | Larsen et al. | |
| 2016/0202756 A1 | 7/2016 | Wu et al. | |
| 2016/0206196 A1 | 7/2016 | Pfleger et al. | |
| 2016/0224110 A1 | 8/2016 | Massonneau et al. | |
| 2016/0246367 A1 | 8/2016 | Tungare et al. | |
| 2016/0252751 A1 | 9/2016 | Kim | |
| 2016/0262608 A1 | 9/2016 | Krueger | |
| 2016/0267391 A1* | 9/2016 | Nistico | H04N 13/344 |
| 2016/0286110 A1 | 9/2016 | Ribardo, Jr. et al. | |
| 2016/0328016 A1 | 11/2016 | Andersson et al. | |
| 2017/0004363 A1 | 1/2017 | Dore et al. | |
| 2017/0017299 A1 | 1/2017 | Biedert et al. | |
| 2017/0031437 A1 | 2/2017 | Qian et al. | |
| 2017/0035293 A1 | 2/2017 | Nistico et al. | |
| 2017/0038607 A1 | 2/2017 | Camara | |
| 2017/0116476 A1* | 4/2017 | Publicover | H04N 23/56 |
| 2017/0123491 A1 | 5/2017 | Hansen | |
| 2017/0136626 A1 | 5/2017 | Wang et al. | |
| 2017/0176778 A1 | 6/2017 | Ushakov | |
| 2017/0188823 A1 | 7/2017 | Ganesan et al. | |
| 2017/0243387 A1 | 8/2017 | Li et al. | |
| 2017/0276934 A1 | 9/2017 | Sarkar | |
| 2017/0308734 A1 | 10/2017 | Chalom et al. | |
| 2017/0332901 A1 | 11/2017 | Hwang et al. | |
| 2017/0351326 A1 | 12/2017 | Aarts et al. | |
| 2017/0363885 A1 | 12/2017 | Blum et al. | |
| 2017/0372487 A1* | 12/2017 | Lagun | G06T 7/33 |
| 2018/0018451 A1 | 1/2018 | Spizhevoy et al. | |
| 2018/0032131 A1 | 2/2018 | Yasuda et al. | |
| 2018/0059782 A1 | 3/2018 | San Agustin et al. | |
| 2018/0089834 A1 | 3/2018 | Spizhevoy et al. | |
| 2018/0095295 A1 | 4/2018 | Chene et al. | |
| 2018/0103194 A1 | 4/2018 | Tang | |
| 2018/0103903 A1 | 4/2018 | Tzvieli et al. | |

(56) References Cited

U.S. PATENT DOCUMENTS

| | | |
|---|---|---|
| 2018/0137358 A1 | 5/2018 | Rousseau et al. |
| 2018/0157045 A1 | 6/2018 | Davami |
| 2018/0157892 A1 | 6/2018 | Han et al. |
| 2018/0180893 A1 | 6/2018 | Gupta |
| 2018/0181809 A1 | 6/2018 | Ranjan et al. |
| 2018/0267604 A1 | 9/2018 | Bhattacharya |
| 2018/0286070 A1 | 10/2018 | Benedetto |
| 2019/0005679 A1 | 1/2019 | Nie |
| 2019/0043216 A1 | 2/2019 | Yabuuchi et al. |
| 2019/0076015 A1 | 3/2019 | Johansson et al. |
| 2019/0080474 A1 | 3/2019 | Lagun et al. |
| 2019/0082170 A1 | 3/2019 | Akahori |
| 2019/0086669 A1 | 3/2019 | Percival et al. |
| 2019/0087973 A1 | 3/2019 | Kaehler et al. |
| 2019/0156100 A1 | 5/2019 | Rougeaux et al. |
| 2019/0265788 A1 | 8/2019 | Yosha et al. |
| 2020/0183190 A1 | 6/2020 | Rousseau et al. |
| 2020/0335065 A1 | 10/2020 | Furuta et al. |
| 2020/0364453 A1 | 11/2020 | Tonsen et al. |
| 2021/0041701 A1 | 2/2021 | Kassner et al. |
| 2021/0049410 A1 | 2/2021 | Dierkes et al. |
| 2021/0247617 A1 | 8/2021 | Kassner et al. |

FOREIGN PATENT DOCUMENTS

| | | |
|---|---|---|
| CN | 102930252 | 2/2013 |
| CN | 103356163 | 10/2013 |
| CN | 105676456 | 6/2016 |
| CN | 106599994 | 4/2017 |
| CN | 206805020 | 12/2017 |
| CN | 107545302 | 1/2018 |
| CN | 107564062 | 1/2018 |
| CN | 109254420 | 1/2019 |
| CN | 109298533 | 2/2019 |
| CN | 109820524 | 5/2019 |
| DE | 19807902 | 9/1999 |
| DE | 102009049849 | 4/2011 |
| DE | 10 2010 018 562 | 10/2011 |
| DE | 10 2014 206 623 | 10/2015 |
| DE | 10 2016 210 288 | 12/2017 |
| EP | 1403680 | 3/2004 |
| EP | 1755441 | 2/2007 |
| EP | 1027627 | 2/2009 |
| EP | 2096577 | 9/2009 |
| EP | 2309307 | 4/2011 |
| EP | 2416280 | 2/2012 |
| EP | 2490155 | 8/2012 |
| EP | 2573650 | 3/2013 |
| EP | 2784632 | 10/2014 |
| EP | 2805671 | 11/2014 |
| EP | 2886041 | 6/2015 |
| EP | 2795888 | 9/2015 |
| EP | 2940555 | 11/2015 |
| EP | 2943835 | 11/2015 |
| EP | 2956844 | 12/2015 |
| EP | 2980628 | 2/2016 |
| EP | 3005030 | 4/2016 |
| EP | 3047883 | 7/2016 |
| EP | 3059629 | 8/2016 |
| EP | 3112922 | 1/2017 |
| EP | 3129849 | 2/2017 |
| EP | 3135464 | 3/2017 |
| EP | 3137938 | 3/2017 |
| EP | 3228238 | 10/2017 |
| EP | 3236338 | 10/2017 |
| EP | 3252566 | 12/2017 |
| EP | 3258308 | 12/2017 |
| EP | 3267295 | 2/2018 |
| EP | 3305176 | 4/2018 |
| EP | 3305179 | 4/2018 |
| EP | 3376163 | 9/2018 |
| EP | 3460785 | 3/2019 |
| EP | 3521911 | 8/2019 |
| FR | 3081565 | 11/2019 |
| TW | M401786 | 4/2011 |
| WO | 9905988 | 2/1999 |
| WO | 9926126 | 5/1999 |
| WO | 2005009466 | 2/2005 |
| WO | 2005094667 | 10/2005 |
| WO | 2007/016739 | 2/2007 |
| WO | 2009043927 | 4/2009 |
| WO | 2010071928 | 7/2010 |
| WO | 2011/144932 | 11/2011 |
| WO | 2012052061 | 4/2012 |
| WO | 2013059940 | 5/2013 |
| WO | 2013067230 | 5/2013 |
| WO | 2014/033306 | 3/2014 |
| WO | 2014085789 | 6/2014 |
| WO | 2014186620 | 11/2014 |
| WO | 2015024031 | 2/2015 |
| WO | 2015/051834 | 4/2015 |
| WO | 2015/072202 | 5/2015 |
| WO | 2015/179253 | 11/2015 |
| WO | 2016025583 | 2/2016 |
| WO | 2016074861 | 5/2016 |
| WO | 2016078911 | 5/2016 |
| WO | 2016097919 | 6/2016 |
| WO | 2016111880 | 7/2016 |
| WO | 2016146486 | 9/2016 |
| WO | 2016146488 | 9/2016 |
| WO | 2017001146 | 1/2017 |
| WO | 2017025486 | 2/2017 |
| WO | 2017027352 | 2/2017 |
| WO | 2017/046419 | 3/2017 |
| WO | 2017053966 | 3/2017 |
| WO | 2017053971 | 3/2017 |
| WO | 2017053972 | 3/2017 |
| WO | 2017053974 | 3/2017 |
| WO | 2017/096396 | 6/2017 |
| WO | 2017151206 | 9/2017 |
| WO | 2017/216118 | 12/2017 |
| WO | 2018000020 | 1/2018 |
| WO | 2018000039 | 1/2018 |
| WO | 2018063451 | 4/2018 |
| WO | 2018149875 | 8/2018 |

OTHER PUBLICATIONS

Swirski, Dodgson: "A fully-automatic, temporal approach to single camera, glint-free 3D eye model fitting", Proc. PETMEI Lund/Sweden, Aug. 13, 2013.

Safaee-Rad, R., Tchoukanov, I., Smith, K., & Benhabib, B. (1992). "Three-dimensional location estimation of circular features for machine vision", IEEE Transactions on Robotics and Automation, 8(5), 624-640.

Dierkes, Kassner, Bulling: "A novel approach to single camera, glint-free 3D eye model fitting including corneal refraction", Proc. ETRA Warsaw/Poland Jun. 2018.

Dierkes, Kassner, Bulling: "A fast approach to refraction-aware eye-model fitting and gaze prediction", Proc. ETRA Denver/USA Jun. 25-28, 2019.

Non-Final Office Action dated Apr. 14, 2021 in U.S. Appl. No. 16/967,090. (126).

Notice of Allowance dated Jul. 21, 2021 in U.S. Appl. No. 16/967,090. (126).

Notice of Allowance dated Oct. 20, 2021 in U.S. Appl. No. 16/967,090. (126).

Non-Final Office Action dated Dec. 17, 2021 in U.S. Appl. No. 16/967,304. (127).

Non-Final Office Action dated Jun. 23, 2021 in U.S. Appl. No. 16/967,323 (128).

Final Office Action dated Nov. 5, 2021 in U.S. Appl. No. 16/967,323 (128).

Non-Final Office Action dated Jan. 27, 2022 in U.S. Appl. No. 16/967,323 (128).

Non-Final Office Action dated Jun. 24, 2021 in U.S. Appl. No. 16/967,363 (129).

Final Office Action dated Jan. 6, 2022 in U.S. Appl. No. 16/967,363 (129).

(56) References Cited

OTHER PUBLICATIONS

Krafka, Building Real-Time Unconstrained, Eye Tracking with Deep Learning, B.S., University of Georgia, Dec. 2015. (112 pgs.).

Krafka, et al., "Eye Tracking for Everyone", University of Georgia, pp. 2176-2184, 2016. (9 pgs.).

Abstract Book—CVPR—2016 Main Conference and Workshops, 2016.

Moritz Kassner, Will Patera, Andreas Bulling: "Pupil: An Open Source Platform for Pervasive Eye Tracking and Mobile Gaze-based Interaction", Proceedings of the 2014 ACM International Joint Conference on Pervasive and Ubiquitous Computing: Adjunct Publication, pp. 1151-1160, ACM Sep. 13-17, 2014.

Marc Tonsen, Andreas Bulling et al: "InvisibleEye: Mobile Eye Tracking Using Multiple Low-Resolution Cameras and Learning-Based Gaze Estimation", Proceedings of the ACM on Interactive, Mobile, Wearable and Ubiquitous Technologies, vol. 1, No. 3, Article 106, Sep. 2017.

Mayberry, Addison, et al. "iShadow: design of a wearable, real-time mobile gaze tracker." Proceedings of the 12th annual international conference on Mobile systems, applications, and services, p. 82-94, ACM, 2014.

Mayberry PhD thesis, Leveraging Eye Structure and Motion to Build a Low-Power Wearable Gaze Tracking System, Oct. 2018.

Ishiguro, Yoshio, et al. "Aided eyes: eye activity sensing for daily life." Proceedings of the 1st Augmented Human International Conference. ACM, 2010.

Fuhl, Wolfgang, et al. "PupilNet: convolutional neural networks for robust pupil detection." arXiv preprint arXiv:1601.04902 (2016).

Baluja, Shumeet, and Dean Pomerleau. "Non-intrusive gaze tracking using artificial neural networks." Advances in Neural Information Processing Systems. 1994.

Pomplun et al. "An artificial neural network for high precision eye movement tracking", Advances in Artificial Intelligence, vol. 861 of the series Lecture Notes in Computer Science, pp. 63-69. 2005.

Zhang, Xucong, et al. "Appearance-based gaze estimation in the wild." Proceedings of the IEEE Conference on Computer Vision and Pattern Recognition. 2015.

Zhang, Xucong, et al. "It's written all over your face: Full-face appearance-based gaze estimation." Computer Vision and Pattern Recognition Workshops (CVPRW), 2017 IEEE Conference on. IEEE, 2017.

Feng Lu, Yusuke Sugano, Takahiro Okabe, and Yoichi Sato: "Adaptive Linear Regression for Appearance-Based Gaze Estimation", IEEE transactions on pattern analysis and machine intelligence (TPAMI) 36, 10 (2014), 2033-2046.

Cihan Topal, Serkan Gunal, Onur Koçdeviren, Atakan Doğan, and Ömer N Gerek: "A Low-Computational Approach on Gaze Estimation With Eye Touch System", IEEE transactions on Cybernetics 44, 2 (2013), 228-239.

Krafka, et al. "Eye tracking for everyone." IEEE Conference on Computer Vision and Pattern Recognition (CVPR), pp. 2176-2184, 2016.

Sugano, Bulling: "Self-calibrating head-mounted eye trackers using egocentric visual saliency." In Proc. ACM Symposium on User Interface Software and Technology (UIST 2015). 363-372.

Huang, Veeraraghavan, Sabharwal: "TabletGaze: Unconstrained appearance-based gaze estimation in mobile tablets" Jul. 16, 2016.

Hickson et al., "Eyemotion: Classifying facial expressions in VR using eye-tracking cameras", arXiv:1707.07204v2 [cs. CV] Jul. 28, 2017.

Anjith George, Aurobinda Routray: "Real-time Eye Gaze Direction Classification Using Convolutional Neural Network", IEEE InternationalConference on Signal Processing and Communication, SPCOM 2016.

Olszewski, K., Lim, J., Saito, S., Li, H.: "High-Fidelity Facial and Speech Animation for VR HMDs". ACM Trans. Graph.35, 6, Article 221 (Nov. 2016).

"Pogocam", Youtube, Jan. 6, 2017, URL: https://www.youtube.com/watc67v=pHumrhISYx4.

Santini, Fuhl, Kasneci: "CalibMe: Fast and Unsupervised Eye Tracker Calibration for Gaze-Based Pervasive Human-Computer Interaction", Proc. CHI 2017, May 6-11, 2017.

Bace, Staal, Sörös: "Wearable Eye Tracker Calibration at Your Fingertips", Proc. ETRA 2018, Jun. 14-17, 2018, Warsaw/Poland.

* cited by examiner

US 12,353,617 B2

SYSTEMS AND METHODS FOR DETERMINING ONE OR MORE PARAMETERS OF A USER'S EYE

CROSS-REFERENCE TO RELATED APPLICATIONS

This Utility Patent Application claims priority under 35 U.S.C. § 371 to International Application Serial No. PCT/EP2019/066043, filed Jun. 18, 2019, which is incorporated herein by reference in its entirety.

TECHNICAL FIELD

Embodiments of the present invention relate to systems for determining one or more gaze-related parameters of a user's eye, in particulars respective systems having a head-wearable device, and to related methods.

BACKGROUND

Current head-mounted eye trackers often rely on explicit extraction of features such as pupil center, infrared (IR) glint position, or pupil contours. Feature extraction is being performed by classic computer vision and image processing algorithms. Gaze direction is then estimated e.g. by a regression function taking the extracted features as inputs.

Feature extraction usually requires high-resolution cameras, which are rather bulky and difficult if not impossible to fully and invisibly integrate into a glasses frame. Lack of integration and occlusions of the user's field-of-view (FOV) limit the acceptability and, in turn, usability of the system and can also negatively influence users' gaze behaviour, i.e. make this behaviour unnatural. In addition, current systems require active infrared illumination of the eye to ease the task of detecting the pupil. This requires IR LEDs to be mounted close to the eye and camera, thereby adding to the chunkiness of the system. Further, the processing of high resolution images is computationally demanding. Such systems therefore require a laptop or at least a small portable computer to be worn by a user for image processing and real-time gaze estimation. Significant bandwidth for the data transfer is also required. Combined with the weight of the cameras and the remaining parts of the device (e.g. cables, camera/usb adapters, transmission/storing modules etc.), that all rest heavily on users' heads, longer recordings in everyday life are rather uncomfortable or even painful. High-resolution sensors and demanding computation, in turn, lead to high power consumption, which either sets a fixed limit to the recording duration through battery capacity, or restricts the user's ability to move around because the system requires an additional external or even wired power supply.

Even further, the camera(s) need(s) to be carefully adjusted to each individual facial geometry in order to allow e.g. for robust pupil feature detection, which requires an additional hardware-level flexibility and manual camera adjustment possibilities. For the same reason, shifts of the eye tracking headset can currently negatively impact gaze estimation accuracy or require frequent (and cumbersome) re-calibration by the user.

Also, known head mounted eye trackers suffer from the disadvantage that environmental stray light being reflected on the test user's eye may negatively influence the eye tracking functionality. In shape-based eye tracking approaches, cameras monitoring the test user's eyes may not be able to distinguish between features of the eyes explicitly used for keeping track of the eye movement and features, such as reflections, arising from environmental lighting conditions. In general, the illumination situation is not very well defined. Reliable eye tracking is often compromised by environmental conditions and undesired stray light disturbing the tracking mechanism. Thus, known head mounted eye tracker devices usually suffer from a limited accuracy and robustness.

The existing eye gaze sensing systems are also far from being widely used in consumer home applications because of two main reasons. Their cost is still high and most systems require a cumbersome and time-consuming calibration procedure. Current calibration processes may be required whenever a user's head moves beyond a threshold distance with respect to the eye tracking device from an original location at which the system was calibrated. Thus, due to the need to hold the head steady respectively to keep a rigid spatial relationship between the eye tracking device and the head or to frequently re-calibrate, current head mounted eye tracking systems using feature- and/or shape-based approaches are difficult to use in consumer settings.

Accordingly, there is a need to further improve the detection of gaze-related parameters.

SUMMARY

According to an embodiment of a system for determining one or more parameters of a user's eye, the system includes a computing unit and a head-wearable device including a first camera having a field of view, and a non-transparent component. The first camera and the non-transparent component are arranged relative to each other so that at least a portion of the eye and at least a portion of the non-transparent component are expected to be in the field of view of the first camera when the user is wearing the head-wearable device. The computing unit implements a neural network and is configured to receive an image from the first camera, feed the image as an input into the neural network, and determine the one or more parameters as an output of the neural network.

According to an embodiment of a method for determining one or more parameters of a user's eye, the method includes providing a head-wearable device including a non-transparent component and a first camera including a field of view. The first camera and the non-transparent component are arranged relative to each other so that at least a portion of the eye and at least a portion of the non-transparent component are expected to be in the field of view of the first camera when the user is wearing the head-wearable device. The first camera of the head-wearable device worn by the user is used for creating an image. The image is fed as an input into a neural network. The one or more parameters are determined as an output of the neural network.

According to an embodiment of a method for creating and updating a database for training a neural network, in particular a convolutional neural network, the method includes presenting a first stimulus to a first user wearing a head-wearable device. The head-wearable device includes a non-transparent component and a first camera arranged next to a first eye of the first user when the first user is wearing the head-wearable device, and optionally a second camera arranged next to a second eye of the first user when the first user is wearing the head-wearable device. The first camera of the head-wearable device is used to generate, when the first user is expected to respond to the first stimulus or expected to have responded to the first stimulus, a first image of at least a portion of the first eye of the first user and at least a portion of the non-transparent component. Optionally, the second camera of the head-wearable device is used to generate a second image of at least a portion of the second eye of the first user and another portion of the non-transparent component when the first user is expected to respond to the first stimulus or expected to have responded to the first stimulus. A first dataset including the first image and a first representation of a gaze-related parameter, in particular a gaze-direction related parameter, and optionally the second image is generated. The first representation is correlated with the first stimulus. A data connection is established between the head-wearable device and the database. The first dataset is added to the database.

According to an embodiment of a method for training a neural network, in particular a convolutional neural network, the method includes providing a database comprising a plurality of datasets, the datasets comprising a respective image including at least a portion of a first eye of a respective user, a respective portion of a non-transparent component of a head-wearable device, a respective corresponding representation of a gaze-related parameter, in particular a respective corresponding value of the gaze-related parameter, and optionally a respective further image including at least a portion of a second eye of the respective user and a respective further portion of the non-transparent component of the head-wearable device. A neural network having a given architecture is provided. Parameters of the neural network are determined using the respective image and optionally the respective further images of a sub-set or of all datasets as input and the respective corresponding representations of the gaze-related parameter of the sub-set or of all datasets as desired output of the neural network.

Other embodiments include corresponding computer systems, computer-readable storage media or devices, and/or computer programs recorded on one or more computer-readable storage media or computer storage devices, each configured to perform the processes of the methods described herein.

A system of and/or including one or more computers can be configured to perform particular operations or processes by virtue of software, firmware, hardware, or any combination thereof installed on the one or more computers that in operation may cause the system to perform the processes. One or more computer programs can be configured to perform particular operations or processes by virtue of including instructions that, when executed by a one or more processors of the system, cause the system to perform the processes.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1A:
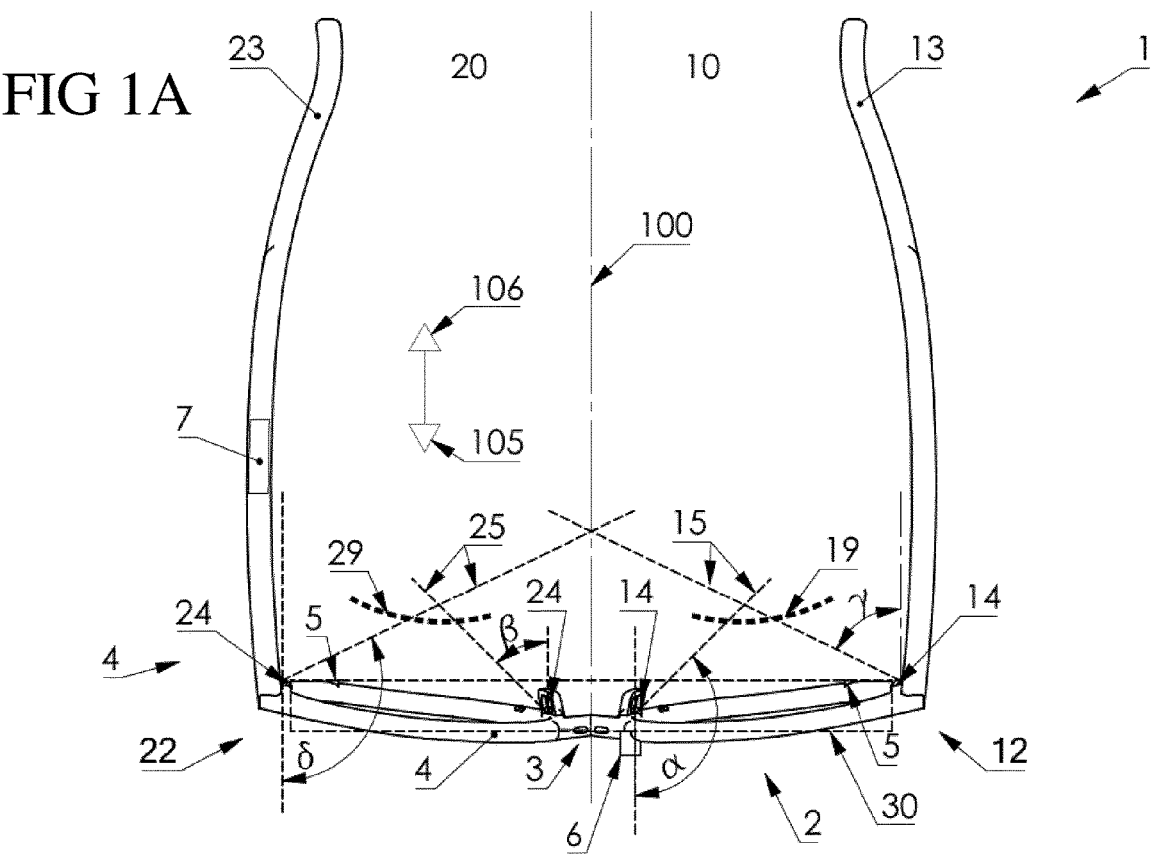
FIG. 1A illustrates a top view of a head-wearable device for determining one or more parameters of a user's eye according to at least one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is a task of the invention to provide methods, systems and head-wearable devices including an eye camera for generating images of a respective eye of a user wearing the head-wearable device(s) allowing for determining of one or more parameters (g) of a user's eye, in particular gaze-related parameters of the user's eye(s) with improved performance and/or accuracy, in particular computationally faster and/or computationally more efficient, and/or improved functional and/or ergonomic characteristics.

Said tasks are solved by the subject matter of the independent claims.

The head-wearable device may be implemented as (head-wearable) spectacles device comprising a spectacles body, which is configured such that it can be worn on a head of a user, for example in a way usual glasses are worn. Hence, the spectacles device when worn by a user may in particular be supported at least partially by a nose area of the user's face. The head-wearable device may also be implemented as an augmented reality (AR-) and/or virtual reality (VR-) device (AR/VR headset), in particular a goggles, an AR head-wearable display, and a VR head-wearable display. For the sake of clarity, head-wearable devices are mainly described with regard to head-wearable spectacles devices in the following.

This state of usage of the head-wearable (spectacles) device being arranged at the user's face will be further defined as the "intended use" of the spectacles device, wherein direction and position references, for example horizontal and vertical, parallel and perpendicular, left and right, front and back, up and down, etc., refer to this intended use. As a consequence, lateral positions as left and right, an upper and lower position, and a front/forward and back/backward are to be understood from user's usual view. Equally, this applies to a horizontal and vertical orientation, wherein the user's head during the intended use is in a normal, hence upright, non-tilted, non-declined and non-nodded position.

The spectacles body (main body) typically includes a left ocular opening and a right ocular opening, which mainly come with the functionality of allowing the user to look through these ocular openings. Said ocular openings can be embodied, but not limited to, as sunscreens, optical lenses or non-optical, transparent glasses or as a non-material, optical pathway allowing rays of light passing through.

The spectacles body may, at least partially or completely, form the ocular openings by delimiting these from the surrounding. In this case, the spectacles body functions as a frame for the optical openings. Said frame is not necessarily required to form a complete and closed surrounding of the ocular openings. Furthermore, it is possible that the optical openings themselves have a frame like configuration, for example by providing a supporting structure with the help of transparent glass. In the latter case, the spectacles device has the form similar to frameless glasses, wherein only a nose support/bridge portion and ear-holders are attached to the glass screens, which therefore serve simultaneously as an integrated frame and as optical openings.

In addition, a middle plane of the spectacles body may be identified. In particular, said middle plane describes a structural centre plane of the spectacles body, wherein respective structural components or portions, which are comparable or similar to each other, are placed on each side of the middle plane in a similar manner. When the spectacles device is in intended use and worn correctly, the middle plane coincides with a median plane of the user.

Further, the spectacles body typically includes a nose bridge portion, a left lateral portion and a right lateral portion, wherein the middle plane intersects the nose bridge portion, and the respective ocular opening is located between the nose bridge portion and the respective lateral portion.

For orientation purposes, a plane being perpendicular to the middle plane shall be defined, which in particular is oriented vertically, wherein said perpendicular plane is not necessarily firmly located in a defined forward or backward position of the spectacles device.

The head-wearable device has an eye camera having a sensor arranged in or defining an image plane for taking images of a first eye of the user, i.e. of a left or a right eye of the user. In other words, the eye camera, which is in the following also referred to as camera and first eye camera, may be a left eye camera or a right (near-) eye camera. The eye camera is typically of known camera intrinsics.

As used herein, the term "camera of known camera intrinsics" shall describe that the optical properties of the camera, in particular the imaging properties (imaging characteristics) of the camera are known and/or can be modelled using a respective camera model including the known intrinsic parameters (known intrinsics) approximating the eye camera producing the eye images. Typically, a pinhole camera model is used for modelling the eye camera. The known intrinsic parameters may include a focal length of the camera, an image sensor format of the camera, a principal point of the camera, a shift of a central image pixel of the camera, a shear parameter of the camera, and/or one or more distortion parameters of the camera.

In addition, the head-wearable device may have a further eye camera of known camera intrinsics for taking images of a second eye of the user, i.e. of a right eye or a left eye of the user. In the following the further eye camera is also referred to as further camera and second eye camera.

In other words, the head-wearable device may, in a binocular setup, have a left and a right (eye) camera, wherein the left camera serves for taking a (left) image or a stream of images of at least a portion of the left eye the user, and wherein the right camera takes a (right) image or a stream of images of at least a portion of a right eye of the user.

Typically, the first and second eye cameras have the same camera intrinsics (are of the same type). Accordingly, determining (a) parameter(s) of the user's eye(s) may be unified.

However, apart from a few exceptions referring to 3D gaze points of the eyes as parameter, the methods explained herein are applicable in a monocular setup with one (near) eye camera only.

The parameter(s) of a user's eye(s) is/are typically gaze-related parameter(s), in particular a gaze-direction related parameter. The gaze-direction related parameter may be a gaze direction, a cyclopean gaze direction, a 3D gaze point, a 2D gaze point, eye pose as 3D position and orientation, a limbus major and/or minor axes orientation, an eye cyclo-torsion, an eye vergence, statistics over eye adduction and/or eye abduction, statistics over eye elevation and/or eye depression, a visual axis orientation, an optical axis orientation, a pupil axis orientation, and a line of sight orientation of the user.

The terms "parameter of a user's eye" and "gaze-related parameter" as used within this specification however intends to describe a broader range of parameters, including but not limited to a gaze direction, a cyclopean gaze direction, a 3D gaze point, a 2D gaze point, eye pose as 3D position and orientation, a pair of 3D gaze directions (left and right eye), a visual axis orientation, an optical axis orientation, a pupil axis orientation, a line of sight orientation, an orientation and/or a position and/or an eyelid closure, a pupil area, a pupil size, a pupil diameter, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a flat and/or a steep axis, a limbus major and/or minor axes orientation, an eye cyclo-torsion, an eye intra-ocular distance, an eye vergence, statistics over eye adduction and/or eye abduction, statistics over eye elevation and/or eye depression, data about cognitive load, blink events, drowsiness and/or awareness of the user, and, a parameter for the user iris verification and/or identification.

In particular, gaze-direction related parameter(s) is/are typically determined with respect to a coordinate system that is fixed to the eye camera(s) and/or the head-wearable device.

For example, a Cartesian coordinate system defined by the image plane(s) of the eye camera(s) may be used.

Points and directions may also be specified within and/or converted into a device coordinate system, a head coordinate system, a world coordinate system or any other suitable coordinate system.

The eye camera(s) can be arranged at the spectacles body in inner eye camera placement zones and/or in outer eye camera placement zones, in particular wherein said zones are determined such, that an appropriate picture of at least a portion of the respective eye can be taken for the purpose of determining one or more a gaze-related parameter; in particular, the cameras are arranged in a nose bridge portion and/or in a lateral edge portion of the spectacles frame such, that an optical field of a respective eye is not obstructed by the respective camera. The optical field is defined as being obstructed, if the camera forms an explicitly visible area/portion within the optical field, for example if the camera points out from the boundaries of the visible field into said field, or by protruding from the boundaries into the field. For example, the cameras can be integrated into a frame of the spectacles body and thereby being non-obstructive. In the context of the present invention, a limitation of the visible field caused by the spectacles device itself, in particular by the spectacles body or frame is not considered as an obstruction of the optical field.

Furthermore, the head-wearable device may have illumination means for illuminating the left and/or right eye of the user, in particular if the light conditions within an environment of the spectacles device are not optimal.

Typically, a frame of the spectacles body is essentially symmetrical to the middle plane, wherein only minor areas, portions or elements of the frame are non-symmetrical.

According to an embodiment, a system for determining one or more parameters of a user's eye includes a head-wearable device, in particular a respective spectacles device and a computing unit which is in the following also referred to as processing unit. The head-wearable device includes a first camera having a field of view, and a non-transparent component. The first camera and the non-transparent component are arranged relative to each other so that at least a portion of the eye and at least a portion of the non-transparent component are expected to be in the field of view (FOV) of the first camera when the user is wearing the head-wearable device. The computing unit implements a (trained) neural network (NN) and is configured to receive an image from the first camera, to feed the image as an input into the neural network, and to determine the one or more parameters as an output of the neural network.

As the portion of the non-transparent component is visible in the images of the first camera, the neural network can, in a training phase as explained below in more detail, implicitly learn to take into account the (first) eye camera pose(s) with respect to the particular head-wearable device for gaze estimation or determination of other eye related parameters.

Note that the eye camera pose(s), i.e. the location and/or orientation within the headset coordinate system, may slightly differ from one head-wearable device to the other due to non-zero manufacturing tolerances, or as well due to slight deformations of a given headset during use (larger or smaller head of the wearer). The accuracy of NN-based determining the eye related parameter can thus be increased without any algorithmic modifications. In particular, no explicit feature extraction in the image(s) is needed and no explicit camera calibration, in particular explicitly determining camera extrinsics (location and orientation of the camera), needs to be performed.

However, an explicit feature detection for the portion of the non-transparent component in the FOV of the camera may also be implemented and its output fed to the neural network (NN) as a separate input, optionally together with the camera intrinsics. Accordingly, the accuracy of determining parameter(s) of a user's eye(s) may further be improved.

Further, "slippage" of the head-wearable device during use can be compensated automatically when an NN trained with suitable images also showing the respective non-transparent component is used for determining the one or more parameters.

Note that (headset) slippage can occur on timescales as short as minutes and, therefore, typically constitutes a challenge for other head-mounted eye-tracking solutions.

Note further that neither particular (fiducial) markers (the reference point or structure is implicitly provided by the non-transparent component) nor extra hardware such as depth cameras or the like are needed.

Not even explicit modelling or knowledge of the exact structure of the non-transparent component of the head-wearable device is required. It typically suffices to ascertain that all head-wearable devices used for generating data for use in training a NN are manufactured according to the same layout.

All this can be achieved without explicitly determining the eye camera or headset pose with respect to a world/global coordinate system or a scene or with respect to the head of the user which may be computationally demanding.

In the prior art, it was commonly assumed that no parts of the headset should be in the FOV of the camera and that the eye should cover a possibly large area in the image for achieving as high as possible resolution available for determining gaze-related parameters with sufficient accuracy.

Surprisingly, the authors of the present application have found that the accuracy of determination of gaze-related parameters may even (at least on average) be increased when parts of the head-wearable device are visible in the images, preferably in respective peripheral areas.

This is due, among other things, to the fact that information regarding the camera pose(s) with respect to the head-wearable device, which can be subject to slight variations due to non-zero manufacturing tolerances, is contained in the image(s) and taken into account automatically.

The head-wearable device may have a second (near-eye) camera which is arranged with respect to the non-transparent component so that at least a portion of a further (second) eye of the user and at least a further portion of the non-transparent component are expected to be in a field of view of the second camera when the user is wearing the head-wearable device (binocular setup).

In other words, the head-wearable device may have a right (near-eye) camera and a left (near-eye) camera for taking respective images of the left and right eyes including respective portions of the non-transparent component.

Within this specification the terms "first camera" and "left camera" are used synonymously. Likewise, the terms "second camera" and "right camera" are used synonymously herein.

Further, the terms "first eye" and "left eye" are used synonymously. Likewise, the terms "second eye" and "right eye" are used synonymously herein. Pairs of images of the first/left and second/right eyes of a user which are taken by the first and second camera at least substantially at the same time, i.e. with a time delay of at most 10 ms, more typically a few ms, e.g. corresponding to an inverse frame rate of the cameras, are in the following also referred to as pairs of corresponding images.

The pose of the camera(s) may be adjustable, fixable and/or fixed with respect to the non-transparent component.

Typically, the pose of the camera(s) is/are fixed with respect to the non-transparent component and/or the coordinate system of the head-wearable device when worn by the user.

However, cameras with restricted movability (e.g. only along a given axis, like in a VR headset to adjust for individual interpupillary distance) may also be used. In devices with some camera position adjustment capabilities, like VR headset/HTC Vive, it may even be possible to implement an alternative position "sensor" which determines, e.g. measures the mutual distances/poses of the cameras, which in turn can inform or form an additional input to the NN used for (gaze) parameter estimation.

In embodiments referring to binocular setup, the computing unit is typically configured to receive an image from the second camera, to feed the image received from the second camera, as an input into the neural network (or another NN), together with or separately from the image received from the first camera, and to determine one or more parameters of the further eye (and/or both eyes) as an output of the neural network.

The term "neural network" (NN) as used in this specification intends to describe an artificial neural network (ANN) or connectionist system including a plurality of connected units or nodes called artificial neurons. The output signal of an artificial neuron is calculated by a (non-linear) activation function of the sum of its inputs signal(s). The connections between the artificial neurons typically have respective weights (gain factors for the transferred output signal(s)) that are adjusted during one or more learning phases. Other parameters of the NN that may or may not be modified during learning may include parameters of the activation function of the artificial neurons such as a threshold. Often, the artificial neurons are organized in layers which are also called modules. The most basic NN architecture, which is known as a "Multi-Layer Perceptron", is a sequence of so called fully connected layers. A layer consists of multiple distinct units (neurons) each computing a linear combination of the input followed by a nonlinear activation function. Different layers (of neurons) may perform different kinds of transformations on their respective inputs. Neural networks may be implemented in software, firmware, hardware, or any combination thereof. In the learning phase(s), a machine learning method, in particular a supervised, unsupervised or semi-supervised (deep) learning method may be used. For example, a deep learning technique, in particular a gradient descent technique such as backpropagation may be used for training of (feedforward) NNs having a layered architecture. Modern computer hardware, e.g. GPUs makes backpropagation efficient for many-layered neural networks. A convolutional neural network (CNN) is a feed-forward artificial neural network that includes an input (neural network) layer, an output (neural network) layer, and one or more hidden (neural network) layers arranged between the input layer and the output layer. The specialty of CNNs is the usage of convolutional layers performing the mathematical operation of a convolution of the input with a kernel. The hidden layers of a CNN may include convolutional layers as well as optional pooling layers (for down sampling the output of a previous layer before inputting it to the next layer), fully connected layers and normalization layers. At least one of the hidden layers of a CNN is a convolutional neural network layer, in the following also referred to as convolutional layer. Typical convolution kernel sizes are for example 3×3, 5×5 or 7×7. The usage of convolutional layer(s) can help to compute recurring features in the input more efficiently than fully connected layers. Accordingly, memory footprint may be reduced and performance improved. Due to the shared-weights architecture and translation invariance characteristics, CNNs are also known as shift invariant or space invariant artificial neural networks (SIANNs). In the following, the term "model of a neural network" intends to describe a set of data required to define a neural network operable in software and/or hardware. The model typically includes data referring to the architecture of the NN, in particular the network structure including the arrangement of neural network layers, the sequence of information processing in the NN, as well as data representing or consisting of parameters of the NN, in particular the connection weights within fully connected layers and kernel weights within convolutional layers.

Traditional eye tracking algorithms extract hand crafted features from the eye images, like for example the pupil contour. The observed features are then used to either fit an eye model to the observations, or to directly regress the output.

In contrast, the systems described herein perform end-to-end learning-based eye parameter estimation, where the input image is directly given to a learning algorithm without prior extraction of handcrafted features.

In a training phase, the network learns to interpret the input image(s) automatically in order to output the correct result. Supervised learning algorithms, such as those employing neural networks (NN) rely on the existence of so-called labelled data, i.e. some kind of input data in combination with ground truth connected to that input data. For example, an image recorded by a camera can represent the input data. The ground truth value or values can be any low or high level piece of information which is encoded in any form in the input data and which is known at the time the input data has been generated.

Figure 1B:
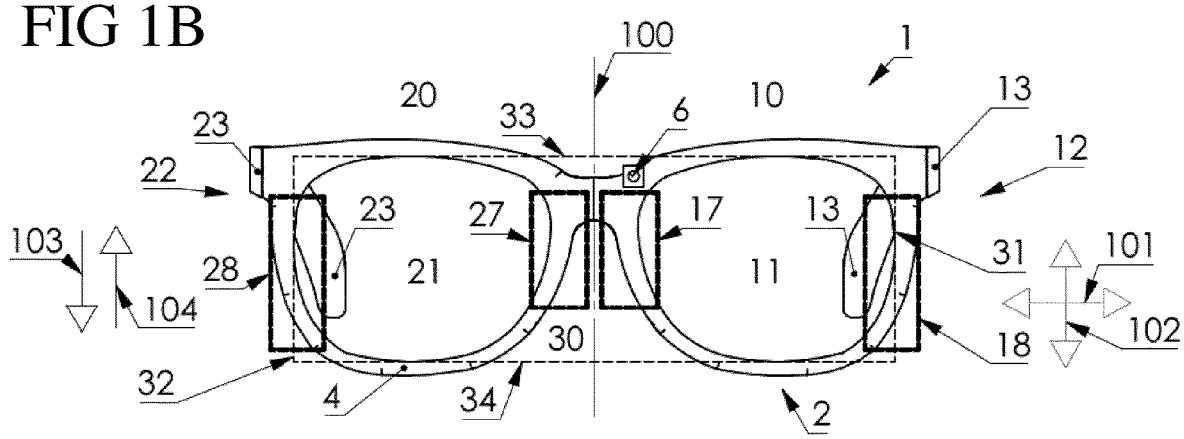
FIG. 1B shows the front view on the head-wearable device according to FIG. 1A.
Figure 1C:
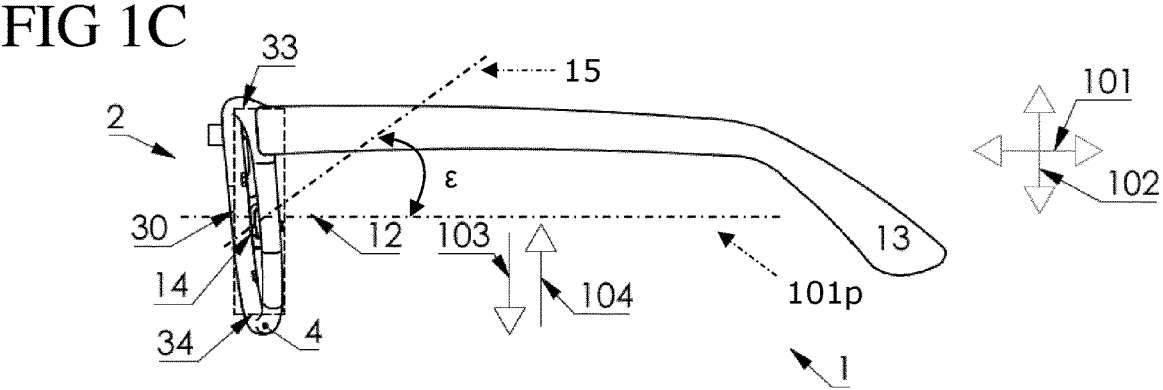
FIG. 1C is a lateral view on the head-wearable device according to FIG. 1A.

For example, a user wearing a head-wearable device as shown in FIG. 1A to FIG. 1C can be asked to look at a particular marker point or object in space, the coordinates of which within the video images recorded by a scene camera connected to the device can be precisely determined. The image or images recorded by one or more optical sensors (cameras) facing the eye(s) of the person then represent the input data which encodes the information about the person's gaze direction, while said coordinates represent the ground truth. Having the person look at markers in many different directions and distances thus produces ground truth for all possible gaze directions. Collecting large amounts of labelled data, also called training data, thus forms the basis for training a learning algorithm.

A NN typically implements a mathematical model with a large number of parameters, which is set up to receive an entity of input data (for example the pixel values of an image stretched into a 1-dimensional vector) and calculates a prediction output in a format corresponding to the ground truth (for example a pair of (x/y) coordinates). The parameters (weights) of the network are usually randomly initialized. The goal of the training procedure is then to optimize the parameters such that when a training example is input, its ground truth value is correctly output. Furthermore, when training is finished, a new entity of labelled input data, also called test data, which has not been used for training, is supposed to produce a correct prediction when fed into the network. The training procedure is done by feeding training examples into the network and for example summing the absolute deviations of the output predictions from the ground truths, which yields a cost value or function. Numerical methods are used to minimize this cost in an iterative fashion which updates the parameters of the network model (backpropagation, gradient descent). A learning rate parameter is part of such methods in order to update the parameters. During the neural network training one typically incrementally decreases the learning rate (learning rate decay), i.e. the step size of the gradient descent algorithm. Decreasing the learning rate following a cosine curve has turned out to be beneficial in significantly reducing training time without impacting accuracy negatively.

The training process can for example be stopped once a desired prediction accuracy based on a set of test data examples is achieved or once the cost does not substantially decrease further. The final values of the parameters can then be digitally stored as a "model" and applied to a new input data example to generate a prediction. Depending on the amount of training data and the complexity of the model, training can be a process requiring several hours or days of calculation time, even when parallelized on many GPUs, while applying the model in a forward pass on a single item of input data is supposed to be quasi instantaneous.

For a regression problem, i.e. a problem with continuous output space like for example predicting a pair of (x/y) coordinates, one typically designs neural networks as follows:

Input→some neural network layers→Intermediate Feature Representation→Linear Combination→Output in $\mathbb{R}^2$ (respectively some small subset of $\mathbb{R}^2$).

A different approach that has shown to increase accuracy works as follows: discretize the output space, i.e. a small subset of $\mathbb{R}^2$, to k different values. Instead of directly regressing the output (for example predicting a pair of (x/y) coordinates), one computes a probability distribution over the possible output values k. As a final output one computes the weighted mean of all values, weighted by their respective probability. The information flow thus becomes:

Input→some neural network layers→Intermediate Feature Representation→Linear Combination→Output in $\{1, \ldots, k\}$→Softmax→Probability distribution P over $\{1, \ldots, k\}$→weighted mean of $\{1, \ldots, k\}$ with P→Output within the small subset of $\mathbb{R}^2$.

Enforcing the representation as a probability distribution as an intermediate result seems to have a regularizing effect and as such reduces the prediction error of the network.

In embodiments referring to convolutional neural networks, the CNN has typically at least 6 layers, and preferably more than 10 layers.

The convolutional neural network may have between 12 and 30 layers, preferably between 16 and 20 layers.

The convolutional neural network typically uses a filter kernel or filter kernels of size M, with M being in the range from 1 to 7, preferably 3 to 5.

Note that filter kernel sizes are often given as a single integer number M. This means that the matrix of the filter is in fact sized M×M×Nc, where Nc is the number of channels in the corresponding layer of the network.

For example, if left and right RGB color images (3 channels) are used as input, then the first convolutional layer may have for M=5 exemplary 16 filter matrices or kernels of 5×5×3 size, resulting in the next layer of data with 16 channels, namely one from each of the convolution with one of the sixteen 5×5×3 filters of the previous layer. Likewise, if left and right grayscale images (1 channel) are used as input, then the respective filter matrices or kernels for M=5 would have a size of 5×5(×1).

The images are typically not pre-processed to obtain spatial and/or temporal patterns or arrangements prior to feeding them to the neural network.

Likewise, the images may not undergo feature extraction prior to feeding it to the neural network.

Further, the output of the neural network is typically not post-processed for determining the one or more parameters.

Typically, the neural network has a two-dimensional input layer (layer of input nodes).

Depending on setup (binocular, monocular and camera resolution) the size of the input layer may vary.

For example, the input layer may be an N×N(×1) matrix (monocular setup) or an N×2N(×1) matrix (binocular setup) of input nodes for a camera image resolution of N×N pixels. Other arrangements of the input images may be used in the binocular setup, such as for example 2N×N(×1) or N×N×2, effectively creating a three-dimensional input layer in the latter case.

N may be smaller or equal than 384, preferably smaller or equal than 192, in particular smaller or equal than 128, more particular smaller or equal than 64.

Even with low resolution grayscale left and right images of 64 times 64 pixels, 50 times 50 pixels or even only 32 times 32 pixels or only 24 times 24 pixels a surprisingly high accuracy (for example lower than 2° mean angular prediction error) and reliability of prediction gaze directions and/or gaze points can be achieved using trained NNs (CNNs).

In addition, the neural network may have input nodes and/or a further input layer for receiving values referring to a type of the respective camera, camera intrinsics of the respective camera, camera extrinsics of the respective camera such as the respective pose, a type of the head-wearable device, and a size measure of or a deformation information referring to the head-wearable device.

Camera extrinsics such as known pose information and intrinsics such as focal length, center pixel shift, shear and distortion parameters may be measured during the production of head-wearable device and then linked to the ID of the head-wearable device and thus serve as input for the NN, which thus receives in the training phase additional "learning aids". Accordingly, both training of the neural network and accuracy of eye parameter prediction using the trained neural network may be further improved. Note however, that such additional inputs are not required for achieving an accuracy gain, which already results from providing visibility of said non-transparent component of the head-wearable device alone.

The non-transparent component maybe provided by a main body of the head-wearable device, a nose bridge portion of the head-wearable device and/or a frame of the head-wearable device.

Typically, the camera(s) is/are arranged on an inner side of the frame, more typically directly facing the respective eye of the user such that a shortest optically possible or feasible path between the outer border of the eye and the outer border of the camera forms a straight line which only intersects air when the user is wearing the head-wearable device. This enables a high (optical) image quality while at the same time enabling a simple hardware layout in which it is still possible to capture a non-transparent component in the image(s).

The camera(s) may be arranged in the nose bridge portion of the head-wearable device, and/or located within a range of 32 to 40, preferably, 34 to 38, in particular 36 degrees with respect to the median plane of the head-wearable device.

The camera(s) may also be arranged in a lateral portion of the head-wearable device, and/or located within a range of 108 to 125 (or −72 to −55), preferably 108 to 116 (or −72 to −64), preferably 110 to 114 (or −70 to −66), preferably 112 (or −68) degrees with respect to the median plane of the head-wearable device.

The processing unit (computing unit) may at least partly be integrated in head-wearable device, for example in a (standard) spectacle frame of the head-wearable device.

Note that using a (trained) convolutional neural network to determine parameter(s) of a user's eye allows a particularly high accuracy and reliability of prediction in real time with comparatively low computational resources.

Therefore, the processes of the detection method may be partly or even completely executed by a processing unit or a computer which is integrated in a wearable device, for example in a (standard) spectacle frame of the head-wearable device.

Alternatively or in addition, the processing unit may be partly or completely integrated into a companion device of the system, in particular a mobile companion device such as a smart phone, a tablet, or a laptop connected with the head-wearable device, or a desktop computer, or even a local or remote server.

Typically, the computing unit includes one or more processors, in particular one or more CPUs, GPUs and/or DSPs, and a neural network software module including instructions which, when executed by at least one of the one or more processors, implement (an instance of) the neural network.

In the following, a method for determining one or more parameters of a user's eye is explained.

According to an embodiment, the method includes providing a head-wearable device as explained herein, taking an image with the first camera of the head-wearable device worn by the user, feeding the image as an input into a neural network, optionally taking an image using the second camera of the head-wearable device worn by the user and feeding the image taken by the second camera as an input into the neural network, and determining the one or more parameters as an output of the neural network.

Typically, the respective image(s) is/are not pre-processed to obtain spatial and/or temporal patterns or arrangements prior to feeding them to the neural network.

Likewise, the respective image(s) does/do not undergo feature extraction prior to feeding to the neural network.

Further, the output of the neural network may not be post-processed for determining the one or more parameters.

In addition to the image(s), at most data referring a type of the respective camera, camera intrinsics of the respective camera, camera extrinsics of the respective camera, a type of the head-wearable device, and/or a size measure of or a deformation information about the head-wearable device may be fed as input into the neural network.

According to an embodiment, a method for creating and updating a database for training a neural network, in particular a convolutional neural network is provided.

The method includes presenting a first stimulus to a first user wearing a head-wearable device as described herein.

The first camera of the head-wearable device is used to generate a first image of at least a portion of the first eye of the first user and at least a portion of the non-transparent component, when the first user is expected to respond to the first stimulus or expected to have responded to the first stimulus.

Optionally, the second camera of the head-wearable device is used to generate a second image of at least a portion of the second eye of the first user and another portion of the non-transparent component, when the first user is expected to respond to the first stimulus or expected to have responded to the first stimulus.

A data connection is established between the head-wearable device and the database. A first dataset including the first image and a first representation of one or more gaze-related parameters, and optionally the second image is generated. The first representation is correlated with the first stimulus. The first dataset is added to the database.

The method allows maintaining and improving the database with the help of the users. As the database can be used for improving the performance of an instance of the neural network used at the user site (e.g. running on the head-wearable device), the users are interested in allowing data exchange between the typically user owned head-wearable device and a computing system for hosting the database and training or retraining the neural network using the database.

In the following the database is also referred to as first database and image database.

Establishing the data connection typically includes connecting the head-wearable device with a computing system operating as a server hosting the database. The head-wearable device may be directly connected with the computing system (server), for example via WLAN and/or an internet connection, or indirectly, for example via a desktop computer, or another companion device such as a tablet, a laptop, or a smartphone (mobile phone) connectable with the head-wearable device and the computing system.

Typically, a plurality of datasets referring to the first user and including a respective image(s), and a respective representation of the gaze-related parameter(s) is generated and added to (stored in) the database.

Accordingly, the database includes datasets of the user allowing a sufficiently good feature generalisation of the neural network during one or more training phases as well as a high accuracy of predicting gaze-related parameters using the trained neural network.

For example, at least 10 datasets, more typically at least 50 datasets and even more typically at least hundred datasets of the first user may be stored in the database.

For this purpose, a second stimulus may be presented to the first user wearing the head-wearable device and the first camera of the head-wearable device may be used to generate, when the first user is expected to respond to the second stimulus or expected to have responded to the second stimulus, a third image of at least a portion of the first eye of the first user and at least the portion of the non-transparent component.

Optionally, the second camera of the head-wearable device is used to generate a fourth image of at least a portion of the second eye of the first user and the other portion of the non-transparent component, when the first user is expected to respond to the second stimulus or expected to have responded to the second stimulus.

A second dataset including the third image and a second representation of the gaze-related parameter, and optionally the fourth image is generated. The second representation is correlated with the second stimulus.

Thereafter, the data connection between the head-wearable device and the database may be (re-) established and the second dataset may be added to the database.

Furthermore, the images of the datasets of the first user (and/or other users) may be generated under different conditions, for example for a fresh and a tired user or at different times and/or for different lighting conditions. Even further, the images of the datasets of the first user may be generated for different distances between a presented stimulus and the user (resulting in different levels of vergence of the eyes).

Therefore, one or more sequences of stimuli may be presented to the first user and respective datasets may be generated and added to the database.

For statistical reasons some of the stimuli may be equal.

For example, the first and/or the second stimulus may be presented twice or more often to the first user.

Depending on the stimulus, a certain time delay may occur between the stimulus and the desired response of the user. The time delay may be in a range from 100 ms or 200 ms to about half a second or even a second.

For example, when a user is requested to look at a non-moving object or marker in his FOV, the user may be expected to have responded after the time delay and gaze thereafter at the object or marker for a time period of about half a second.

When a user is, in response to a respective stimulus, gazing at one of his moving fingertips, the time delay may even be insignificant during the movement. Accordingly, the user may be expected to respond to the stimulus during the movement of the fingertip.

Furthermore, generating the respective dataset typically includes selecting a pair of first and/or second (left and/or right) images from respective video streams or image sequences obtained using the respective first and second cameras.

For example, when a user is requested to look at a non-moving object or marker in his FOV, selecting the image pair respectively ensuring its validity may include determining automatically that the gaze of the user has become stable or analysing the trajectory of the predicted gaze or utilising a separate mechanism, such as for example a separately trained neural network, for saccade or fixation detection.

Furthermore, a video stream or image sequence may be used to generate a plurality of datasets. For example, datasets referring to different gaze points/gaze directions may be generated using a video stream or image sequence obtained with (e.g. recorded with) the first camera, using a video stream or image sequence obtained with the second camera, and a video stream or image sequence obtained with a scene camera of a respective head-wearable device.

Typically, respective datasets referring to several users are generated and added to (stored in) the database.

Accordingly, the feature generalisation of the neural network in the training phase as well as the accuracy of predicting gaze-related parameters using the trained neural network may be further improved as more and more datasets from an increasing number of users and recorded under varying conditions are added.

Typically, datasets referring to at least 10 users, more typically to at least 100 users and even more typically to at least several hundred, several thousand or even several 10,000 users or more may be stored in the database.

For example, a third stimulus may be presented to a second user wearing the head-wearable device.

The first camera of the head-wearable device may be used to generate, when the second user is expected to respond to the third stimulus or expected to have responded to the third stimulus, a fifth image of at least a portion of a first eye of the second user and at least a portion the a non-transparent component.

Optionally, the second camera of the head-wearable device may be used to generate a sixth image of at least a portion of a second eye of the second user and another portion of the non-transparent component when the second user is expected to respond to the third stimulus or expected to have responded to the third stimulus.

A third dataset including the fifth image and a third representation of the gaze-related parameter, and optionally the sixth image may be generated. The third representation being correlated with the third stimulus.

A data connection between the head-wearable device and the database may be established and the third dataset may be added to the database.

Likewise, a fourth stimulus may be presented to the first user, the second user or a third user wearing a further head-wearable device as explained herein.

The first camera of the further head-wearable device may be used to generate a seventh image of at least a portion of the first eye of the respective user and at least a portion the non-transparent component of the further head-wearable device when the respective user is expected to respond to the fourth stimulus or expected to have responded to the fourth stimulus.

Optionally, the second camera of the further head-wearable device may be used to generate an eighth image of at least a portion of a second eye of the respective user and another portion of the non-transparent component of the further head-wearable device when the respective user is expected to respond to the fourth stimulus or expected to have responded to the fourth stimulus.

A data connection between the further head-wearable device and the database may be established.

A fourth dataset comprising the seventh image and a fourth representation of the gaze-related parameter(s), and optionally the eighth image may be generated. The fourth representation is correlated with the fourth stimulus.

The fourth dataset may be added to the database.

The dataset(s) may be generated at the user side, for example using a processing unit of the respective head-wearable device and/or of a connected desktop computer, tablet, laptop, or smartphone.

Further, the dataset(s) may be locally stored until a connection with the computing system (server) is available.

Furthermore, the first camera of the head-wearable device or the further head-wearable device may be used to generate a further image of at least a portion of the first eye of the first or the second user and/or the second camera of the respective head-wearable device may be used to generate a further image of at least a portion of the second eye of the respective user, when the respective user is expected to respond to the further stimulus or expected to have responded to the further stimulus. A further dataset including the further left image and the further right image may be generated and added to the database.

The authors have found out, that a certain fraction of weakly labelled datasets, i.e. datasets with less accurate known gaze-related parameters, or even non-labelled datasets, i.e. datasets for which no valid representations, e.g. values of the gaze-related parameter(s) are known, can still improve the performance of the NN trained using the database. This is because even unlabeled datasets include information about the contained image diversity.

For example, the database may include up to 70%, more typically up to 80%, and even more typically up to 90% or more of weakly and/or non-labelled datasets.

In one embodiment, more than one gaze-related parameter, for example two or three gaze-related parameters are added with at least one of the datasets to the database.

According to an embodiment, a respective given or resulting value of the gaze-related parameter(s) is determined for the respective user expected to respond or have responded to the respective stimulus.

The determined given or resulting value of the gaze-related parameter(s) may be used as respective representation of the gaze-related parameter(s) of the dataset(s).

The determined given or resulting value may be considered as the actual or ground truth value of the gaze-related parameter.

In the following, a dataset which includes a left image of at least a portion of the left eye, a right image of at least a portion of the right eye and a corresponding actual or ground truth value of one or more a gaze-related parameters such as the gaze point or gaze direction is also referred to as labelled dataset. Typically, the two images of a dataset are taken at substantially the same time, i.e. within a time period of at most 50 ms or even at most 10 ms.

Labelled datasets are particularly valuable for training NNs.

According to embodiments, a gaze-related parameter determination unit, in particular a respective unit of the respective head-wearable device is used to determine the respective given or resulting value of the gaze-related parameter, in particular the respective given or resulting gaze direction and/or the respective given or resulting gaze point for the respective user.

In one embodiment, a scene camera arranged to capture a given object in the field of view of the respective user wearing the respective head-wearable device is used for capturing images which can be used as a basis for determining a respective resulting value of the gaze-related parameter. The scene camera may be provided/be part of the head-wearable device.

For example, in response to a respective stimulus, e.g. a visual stimulus and/or an acoustical stimulus, the respective user is caused to gaze/gazes at a given respective object defining a respective given gaze direction relative to a co-ordinate system fixed with the respective head-wearable device and/or a respective given gaze point in the co-ordinate system.

According to an exemplary embodiment, the respective user is requested by a visual stimulus or an acoustical stimulus to look at a marker or object, for example a tip of one of his fingers.

As already explained above, the respective user may be requested to look at his fingertip held in different positions, or to follow his fingertip with the eyes while moving. Therefore, even a single stimulus may be used to generate a sequence of datasets each including a respective left image, a respective right image and a different resulting value of the respective gaze-related parameter(s) as representation of the gaze-related parameter(s).

A respective left image and/or a respective right image may be generated, when the respective user is expected to gaze at the respective given object, into the respective given direction and/or at the respective given gaze point.

Thereafter, the resulting value(s) of the given gaze direction and/or the given gaze point in the co-ordinate system fixed with the respective head-wearable device may be determined using a scene image of the user's field of view (FOV) when the respective user is expected to gaze at the respective given object, into the respective given direction and/or at the respective given gaze point. The scene image may be obtained using the scene camera.

Furthermore, determining and storing the resulting value(s) in the co-ordinate system fixed with the respective head-wearable device facilitate their later use.

Determining the resulting value(s) may be achieved using state-of-the-art machine learning, computer vision or image recognition techniques.

Each user has an interest in improving the accuracy and robustness of the predictions of the NN which is trained/retrained using the database, and thus depend on the quality of the datasets provided by the user(s).

This applies also to a further embodiment in which a desired value of the gaze-related parameter is used to determine the position and/or appearance of an object to be displayed in the user's FOV. In the following, the desired value of the gaze-related parameter is also referred to as given value of the gaze-related parameter.

For example, the user may be requested to look at a given marker or object displayed at given (desired) position on a screen of and/or wearable to the head-wearable device.

In fact, the gaze direction/gaze point may be accurately detected in many cases even if the left image or the right image or even both images do not contain a pupil or only a portion of the respective pupil.

A right IR-light source of the respective head-wearable device may be used to illuminate the right eye of the respective user and a left IR-light source of the respective head-wearable device may be used to illuminate the left eye of the respective user in embodiments referring to IR-cameras for the left and the right eye, respectively. IR-illumination may only be used/invoked when the image quality is too low or expected to be low, for example in a dark environment. IR-illumination may also be on permanently, or always be on and only switched off to save power and/or when image quality is sufficient without illumination.

Generating or adding the dataset may include concatenating the respective left image and the respective right image. Note that concatenated images may be presented directly to a 2-dimensional input layer of the NN.

Furthermore, generating or adding the respective dataset may include storing a respective representation of a further gaze-related parameter different to the gaze-related parameter, a respective user ID, a respective user-group ID and/or a device ID of the respective head-wearable device. The respective user-group ID may also be part of the user ID.

Storing the respective user ID, the respective user-group ID and/or the device ID of the respective head-wearable device in the datasets of the database may facilitate training the neural network in a device specific, user specific and/or user group specific manner.

For example, the neural network may be trained specifically for children, adults, elderly people, people of a common ethnic origin, women, men, a group of people with common background, visually impaired people, a particular device, device class, user ID, user group and the like.

The database may include respective datasets of a variety of users, states of the users, lighting conditions (indoor and/or outdoor lighting conditions), slippage states of the worn head-wearable device, and/or different distances between the user and a presented object at which the user is gazing.

According to an embodiment of a method for training a neural network, in particular a convolutional neural network, the method includes providing a database having a plurality of datasets. Each datasets includes a respective image including at least a portion of a first eye of a respective user, a respective portion of a non-transparent component of a head-wearable device, a respective corresponding representation of one or more gaze-related parameters, in particular a respective corresponding value of the one or more gaze-related parameters, and optionally a respective further image including at least a portion of a second eye of the respective user and a respective further portion of the non-transparent component of the head-wearable device.

A neural network having a given architecture is provided. Parameters of the neural network are determined using the image and optionally the further image of a sub-set or of all datasets as input and the respective corresponding representations of the gaze-related parameter of the sub-set or of all datasets as desired output of the neural network.

For sake of clarity, the method for training the neural network is also referred to as training method.

According to an embodiment, a trained neural network, i.e. a neural network trained with all or selected datasets of the database as explained herein, is used to predict to predict one or more parameters of a user's eye, in particular respective gaze-related parameter(s) such as the user's eye gaze direction and/or a user's eye gaze point, when the user is wearing a respective head-wearable device, from a (new) first image generated by the first camera and optionally a (new) second image generated by the second camera of the respective head-wearable device, typically in real-time.

As already mentioned above, the training method may be user or user group specific.

Accordingly, a particularly high reliability and/or accuracy of neural network predictions may be achieved for the user or the user group.

Furthermore, the trained neural network may be used to determine a further gaze-related parameter, an ocular parameter and/or a physiological parameter of the user.

For example, the trained neural network may have been trained to detect based on the left and/or right images if the user is (getting) tired, distracted, their cognitive load changes or the like.

According to an embodiment, a system for improving the prediction of gaze-related parameters includes at least one head-wearable device as explained herein, a processing unit implementing an NN as explained herein and a computing system. The computing system is connectable with the processing unit, and configured to host a first database and to train the neural network, in particular a convolutional neural network, using the first database. The processing unit is connectable with the first camera and optionally with the optional second camera, and configured to determine a predicted value of one or more parameters of a user's eye, in particular a gaze-related parameter of the user using the first image taken with the first camera and optionally the second image taken with the second, as input of the neural network. The system is configured to add datasets to the first database and to transfer parameters of the neural network (or even a complete model of the NN) from the computing system to the processing unit. The added datasets include a respective first (left) image, a respective representation of the gaze-related parameter of the user, and optionally a respective second (right) image and.

Typically, the system includes a plurality of head-wearable devices as explained herein.

Accordingly, datasets of many users can contribute to update the database and thus to improve (via training or retraining using the database) the neural network transferred to and used for predicting the gaze-related parameter(s) at the user site.

In an exemplary embodiment, a gaze-related parameter determination unit of the respective head-wearable device is used to determine a given or resulting gaze direction of the user and/or a given or resulting gaze point as the desired value of the respective gaze-related parameter.

The gaze-related parameter determination unit may include a scene camera arranged to capture a field of view of the user wearing the respective head-wearable device.

Note that not only the instance but also the implementation of the NN in the training phase (in the computing system) and the running phase (at the user site) may differ.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

With reference to FIGS. 1A to 1C, a generalised embodiment of a head-wearable spectacles device for determining one or more gaze-related parameters of a user is shown. In fact, with the help of FIGS. 1A and 1C a plurality of embodiments shall be represented, wherein said embodiments mainly differ from each other in the position of the cameras 14, 24. Thus, the spectacles device 1 is depicted in FIG. 1A with more than one camera 14, 24 per ocular opening 11, 21 only for presenting each embodiment. However, in this embodiment the spectacles device does not comprise more than one camera 14, 24 associated to each ocular opening 11, 21.

FIG. 1A is a view from above on said spectacles device 1, wherein the left side 10 of the spectacles device 1 is shown on the right side of the drawing sheet of FIG. 1A and the right side 20 of the spectacles device 1 is depicted on the left side of the drawing sheet of FIG. 1A. The spectacles device 1 has a middle plane 100, which coincides with a median plane of the user of the spectacles device 1 when worn according to the intended use of the spectacles device 1. With regard to user's intended use of the spectacles device 1, a horizontal direction 101, a vertical direction 102, 100, a direction "up" 104, a direction "down" 103, direction towards the front 105 and a direction towards the back 106 are defined.

The spectacles device 1 as depicted in FIG. 1A, FIG. 1B, and FIG. 1C comprises a spectacles body 2 having a frame 4, a left holder 13 and a right holder 23. Furthermore, the spectacles body 2 delimits a left ocular opening 11 and a right ocular opening 21, which serve the purpose of providing an optical window for the user to look through, similar to a frame or a body of normal glasses. A nose bridge portion 3 of the spectacles body 2 is arranged between the ocular openings 11, 21. With the help of the left and the right holder 13, 23 and support elements of the nose bridge portion 3 the spectacles device 1 can be supported by ears and a nose of the user. In the following, the frame 4 is also referred to as front frame and spectacles frame, respectively.

According to the embodiments represented by FIG. 1A, a left eye camera 14 and/or a right eye camera 24 can be arranged in the spectacles body 2. Generally, the nose bridge portion 3 or a lateral portion 12 and/or 22 of the spectacles body 2 is a preferred location for arranging/integrating a camera 14, 24, in particular a micro-camera.

Different locations of the camera(s) 14, 24 ensuring a good field of view on the respective eye(s) may be chosen. In the following some examples are given.

If a camera 14 or 24 is arranged in the nose bridge portion 3 of the spectacles body 2, the optical axis 15 of the left camera 14 may be inclined with an angle α of 142° to 150°, preferred 144°, measured in counter-clockwise direction (or −30° to −38°, preferred −36°) with respect to the middle plane 100. Accordingly, the optical axis 25 of the right camera 24 may have an angle θ of inclination of 30° to 38°, preferred 36°, with respect to the middle plane 100.

If a position of a camera 14, 24 is located in one of the lateral portions 12, 22 of the spectacles body 2, the optical axis 15 of the left camera 14 may have an angle γ of 55° to 72°, preferred 68° with respect to the middle plane, and/or the optical axis 25 of the right camera 24 may be inclined about an angle δ of 125° to 108° (or −55° to −72°), preferred 112° (or −68°).

Furthermore, a bounding cuboid 30—in particular a rectangular cuboid—may be defined by the optical openings 11, 21, which serves four specifying positions of camera placement zones 17, 27, 18, 28. As shown in FIG. 1A, FIG. 1B, and FIG. 1C the bounding cuboid 30—represented by a dashed line—may include a volume of both ocular openings 11, 21 and touches the left ocular opening 11 with a left lateral surface 31 from the left side 10, the right ocular opening 21 with a right lateral surface 32 from the right side 20, at least one of the ocular openings 11, 21 with an upper surface 33 from above and from below with a lower surface 34.

In case a left/right camera 14, 24 is arranged in the nose bridge portion 3, a projected position of the left camera 14 would be set in a left inner eye camera placement zone 17 and the right camera 24 would be (projected) in the right inner eye camera placement zone 27.

When being in the left/right lateral portion 12, 22, the left camera 14 may be positioned—when projected in the plane of the camera placement zones—in the left outer eye camera placement zone 18, and the right camera 24 is in the right outer eye camera placement zone 28.

With the help of the front view on the spectacles device 1 depicted in FIG. 1B the positions of the eye camera placement zones 17, 18, 27, 28 are explained. In FIG. 1B rectangular squares represent said eye camera placement zones 17, 18, 27, 28 in a vertical plane perpendicular to the middle plane 100.

As a preferred option, all embodiments of the spectacles device 1 as represented by FIG. 1A to 1C have in common, that no more than one camera 14/24 is associated to one of the optical openings 11, 21. Typically, the spectacles device 1 does only comprise one or two cameras 14, 24 to take a picture of a left and a right eye, respectively.

The angle ε shown in FIG. 1C refers to an inclination of the optical camera axis 15 of the left camera 14 in relation to a horizontal plane 101p parallel to the horizontal direction 101. Typically, the respective inclination angle ε of the optical camera axes 15, 25 of the camera(s) 14, 24 is in a range from about 0° to 45°, more typically in a range from about 14° to 24°, in particular 19°.

As shown in FIG. 1A, the head-wearable (spectacles) device 1 comprises a computing unit 7 configured for processing the left and/or the right image from the respective camera 14, 24 for determining parameter(s) of the respective eye.

Depending on the setup (pose of the camera(s) 14, 24), at least a respective portion of the main body 2, the nose bridge portion 3 and/or the frame 4 of the head-wearable device 1, which is in the FOV of the respective camera 14, 24 when worn by a user, is non-transparent (in a wavelength sensitivity range of the respective camera 14, 24) and thus detectable by the respective camera 14, 24. For example, the respective portion may be reflective, opaque or even highly absorbent in a visible and/or an infrared wavelength range.

In other words, the main body 2, the nose bridge portion 3 and/or the frame 4 may form the non-transparent component of the head-wearable device 1.

The computing unit 7 is connected with the camera(s) 14, 24, implements a neural network and is configured to receive respective images from the camera(s) 14, 24 showing the left/right eye of the user and a respective portion or part of the non-transparent component 2, 3, 4. The images are fed after each other or as a pair of corresponding left and right images as input to the neural network and the respective one or more parameters of the eye(s) are obtained as output of the neural network.

The computing (processing) unit 7 may be non-visibly integrated within the holder, for example within the right holder 23 or the left holder 13 of the spectacles device 1. According to a non-shown embodiment, a processing unit 7 can be located within the left holder. Alternatively, the processing of the left and the right images from the cameras 14, 24 for determining the (gaze-related) parameter(s) may alternatively be performed by a connected companion device such as smartphone or tablet or other computing device such as a desktop or laptop computer, and may also be performed entirely offline, based on videos recorded by the left and/or right cameras 14, 24.

The head-wearable device 1 may also include components that allow determining the device orientation in 3D space, accelerometers, GPS functionality and the like.

The head-wearable device 1 may further include any kind of power source, such as a replaceable or rechargeable battery, or a solar cell. Alternatively (or in addition), the head-wearable device may be supplied with electric power during operation by a connected companion device such as smartphone or tablet, and may even be free of a battery or the like.

According to an embodiment, the computation of the user's eye parameter(s) as explained herein is done by the computing unit 7 which is fully and invisibly integrated into a standard spectacle frame.

The head-wearable device may however also be embodied in configurations other than in the form of spectacles, such as for example as integrated in the nose piece or frame assembly of an AR or VR head-mounted display (HMD) or goggles or similar device, or as a separate nose clip add-on or module for use with such devices.

Figure 3A:
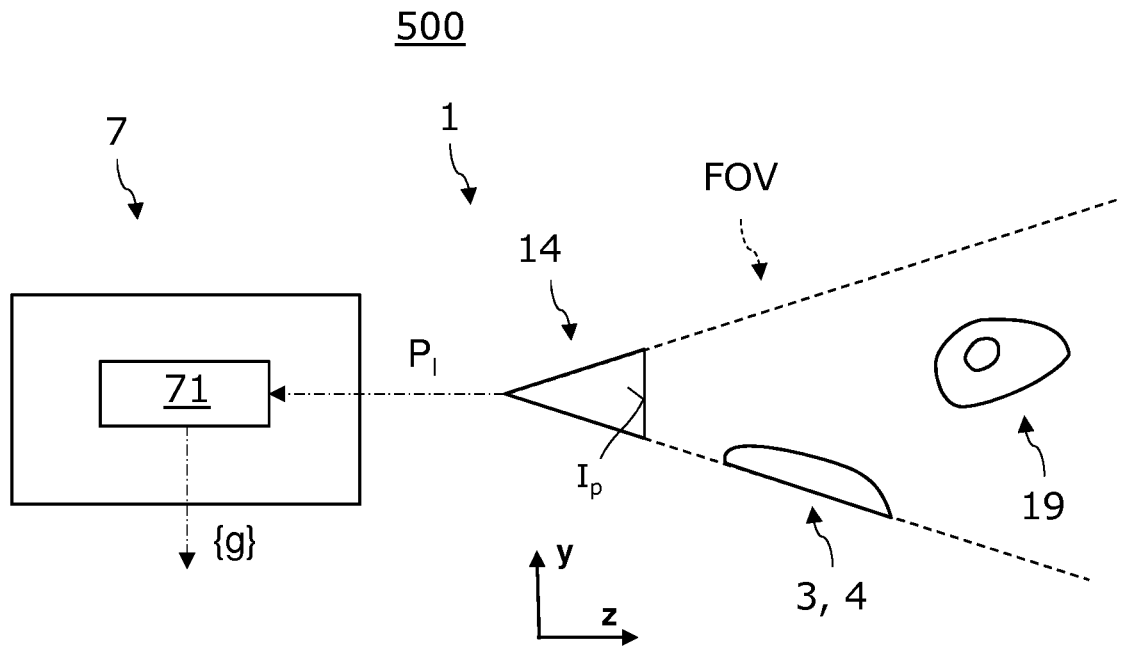
FIG. 3A illustrates a system for determining one or more parameters of a user's eye according to at least one embodiment.

As illustrated in FIG. 3A, the system 500 for determining one or more parameters {g} of a user's eye may also have computing unit 7 which is (connectable) connected with (for transferring images $P_l$) but separate to the head-wearable device 1.

For example, the computing unit 7 may be provided by a companion device such as a smart phone or tablet.

In the exemplary embodiment, only a first camera 14 arranged such that the first eye 19 of the user and a portion of the nose bridge portion 3 and/or of the frame 4 of the head-wearable device 1 is in the field of view FOV of the first camera 14 having an image sensor arranged in or defining an image plane Ip defining an exemplary Cartesian coordinate system x, y (, z).

The exemplary computing unit 7 has one or more processors, in particular one or more CPUs, GPUs and/or DSPs and a neural network module 71 implementing an instance of a neural network. Accordingly the neural network model 71 includes (software) instructions which, when executed by at least one of the one or more processors, implement the instance of the neural network.

This allows for efficient and accurate determination of one or more parameters {g} of a user's eye. Note that brackets { } indicate a collection of values and/or data which may have indices (subscripts), for example data sets.

Figure 2A:
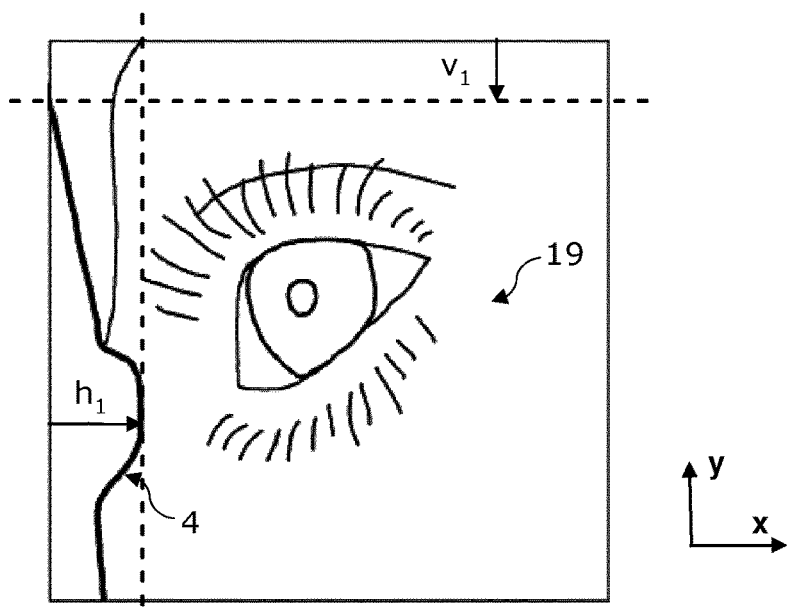
FIG. 2A to 2C illustrates images taken by the head-wearable device according to FIG. 1A.
Figure 2B:
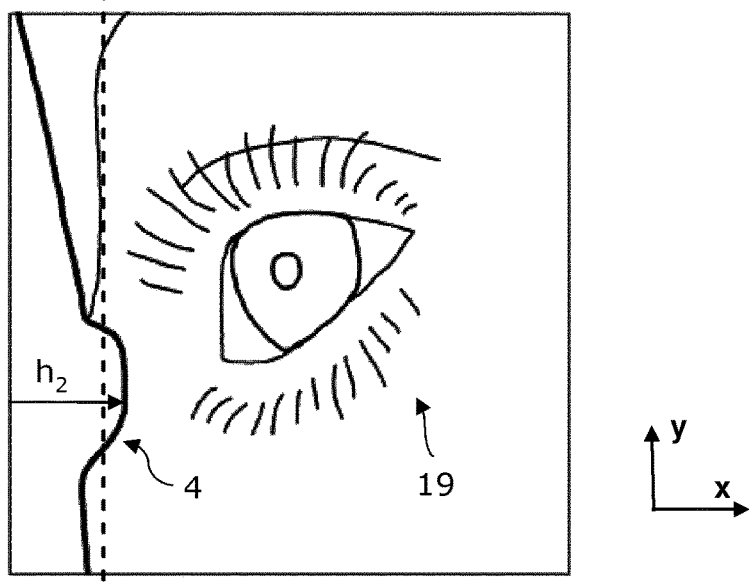
Figure 2C:
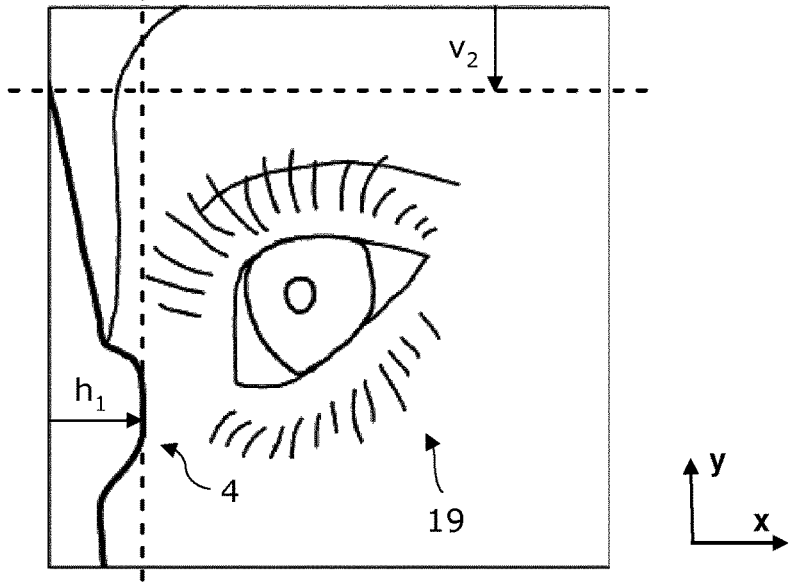

FIG. 2A to 2C schematically show respective images taken by a first camera 14 of the head-wearable devices 1 as explained herein.

In the exemplary embodiment, each of the three images shows the first (left) eye 19 of a user and a non-transparent part of the frame 4 of different head-wearable (spectacles) devices of the same series at exactly the same position on the user's head. In all three images the eye fixates exactly the same point in 3D space with respect to a head fixed coordinate system (not shown). In other words, the ground truth 3D gaze point of the user is the same in all three images.

Due to manufacturing tolerances of the spectacles device, e.g. with respect to the camera angles γ (see FIG. 1A) and/or E (see FIG. 1C), or the camera positions, both the position of the eye 19 and the position of the part of the frame 4 visible in the images (slightly thicker line on the left) shift in relation to the edge of the image. This is indicated in FIGS. 2A to 2C by the horizontal coordinates $h_1$, $h_2$ and the vertical coordinates $v_1$, $v_2$.

Since the neural network used for determining one or more parameters of a user's eye 19 was trained with a plurality of images showing the eye(s) and the respective non-transparent portion of the head-wearable device, the images having been recorded with different head-wearable device (of the same series), eye parameter prediction is improved since the neural network as learned to interpret the additional information represented implicitly by the horizontal coordinates $h_1$, $h_2$ and the vertical coordinates $v_1$, $v_2$.

Likewise, slippage of the head-wearable device(s), in which the position of the eye in the image would change, but not that of the frame part 4 is typically also (implicitly) taken into account by the trained neural network.

Figures 3B, 3C, 3D:
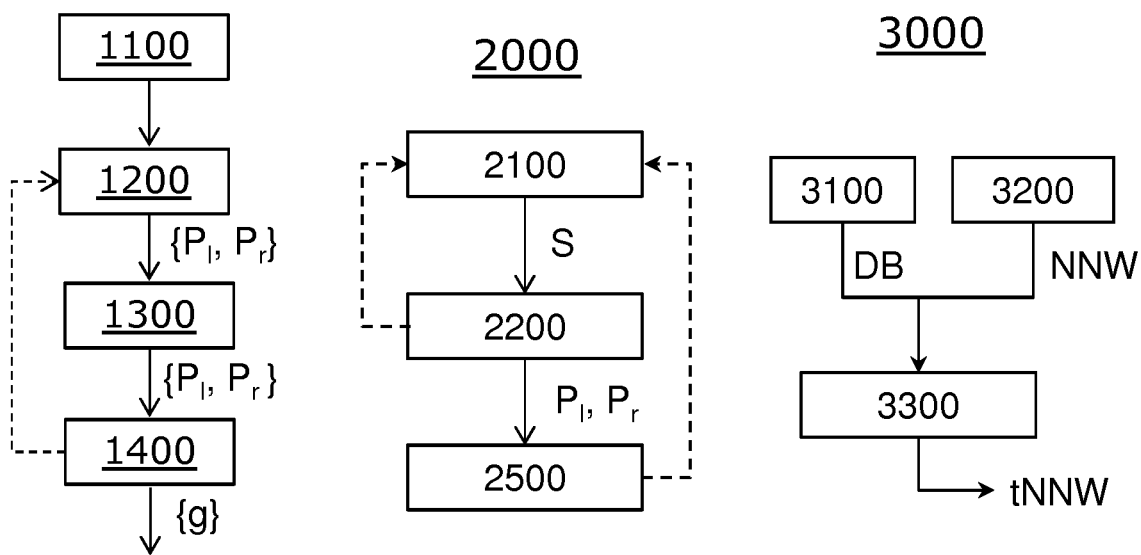
FIG. 3B illustrates a flow chart of a method for determining one or more parameters of a user's eye according to embodiments.
FIG. 3C illustrates a flow chart of a method for creating and updating a database for training a neural network according to embodiments.
FIG. 3D illustrates a flow chart of a method for training a neural network according to embodiments.

With reference to FIG. 3B, embodiments of a method 1000 for determining one or more parameters of a user's eye are explained.

In a first step 1100, a head-wearable device having a first camera and optionally as second camera as explained herein are provided and are put on by a user, respectively.

In a subsequent step 1200 an image $P_l$, for example a first left image is taken by the first camera. Optionally, a further image $P_r$, for example a first right image is taken by the second camera.

The image $P_l$ or $P_r$ or even a pair of corresponding images $\{P_l, P_r\}$ is fed as input into a (suitably trained) neural network in a subsequent step 1300.

The one or more parameters $\{g\}$ of the user's eye(s) are obtained as output of the neural network in a step 1400.

As indicated by the dashed arrow in FIG. 3B, the steps 1200 to 1400 may be repeated several times.

Typically, a trained CNN is used for determining the one or more parameters $\{g\}$.

With reference to FIG. 3C, embodiments of a method 2000 for creating and updating a database are explained. The database is typically used for training a neural network, in particular a convolutional neural network. This is explained below with regard to FIG. 3D in more detail.

In a first step 2100, a first stimulus S is presented to a user wearing a head-wearable device. The head-wearable device may be any of the head-wearable devices described herein. It may be implemented as a spectacles device, e.g. a glasses, a goggles, an AR head-wearable display, and a VR head-wearable display. The head-wearable device has a first camera arranged next to a first eye of the user and optionally a second camera arranged next to a second eye of the user when the first user is wearing the head-wearable device.

The database may be used for training the neural network to predict one or more parameters of a user's eye, particular respective gaze-related parameter(s) such as a user's eye gaze direction and/or a user's eye gaze point, when the user is wearing the head-wearable device, from an image generated by the first camera or even a pair of a (left) image generated by the first camera and a (right) image generated by the second camera as input of the neural network.

Accordingly, the database may include a plurality of datasets including pairs of left and right images and one or more corresponding values of gaze-related parameters considered to be respective actual values or ground truth values.

Further, the database may be user specific.

More typically, the database includes datasets of a plurality of users, i.e. of a first user, a second user, a third users, a fourth user and so on and so forth. For sake of clarity, the following description is mainly given for an exemplary user or first user.

Using datasets of a plurality of users for training the neural networks may enhance learning (generalization) and thus improve the accuracy and/or liability of the predictions of the NN.

Likewise, the database typically includes datasets obtained using several head-wearable devices which are typically of the same type/series. At least the positions and alignments of the left and right camera of the head-wearable devices are typically at least substantially equal. Alternatively, the positions and alignments of the camera(s) of the head-wearable devices are also stored (coded) in the datasets and used as additional inputs for training the neural network.

Only for sake of clarity it is, in the following, assumed that the head-wearable devices have two respective (near eye) cameras, i.e. a first camera and a second camera each of which is arranged such that at respective eye of the user and a respective non-transparent component of the respective worn head-wearable device is in the field of view of the first camera and the second camera, respectively. This is however to be understood as not limiting. The skilled person appreciates that the method 2000 is fully operable for head-wearable device with one (near eye) camera only.

In a subsequent step 2200, the first and second cameras of the head-wearable device record a respective image $P_l$, $P_r$, typically a respective photo, of the users left and right eye when the user is expected to respond to the first stimulus or expected to have responded to the first stimulus. The image $P_l$, $P_r$ may also be selected from a respective video stream or image sequence recorded using the first and second cameras.

In a subsequent step 2500, a dataset consisting of or including the left image $P_l$, the right image $P_r$ and a representation of a (desired) gaze-related parameter is saved (stored) in the data base. The representation of the gaze-related parameter may be a given or determined respective (ground truth) value of the gaze-related parameter, but also any other representation such as a corresponding image of a scene camera that is correlated with the first stimulus and suitable for determining the (ground truth) value of the gaze-related parameter.

In one embodiment, the user wearing the head-wearable device is requested in step 2100 by an acoustic stimulus, a visual stimulus or a combination or sequence of acoustic and visual stimuli, to look at (gaze at) a given object in his field of view (FOV). The given object may be a real object in the user's FOV such as a finger tip of the user, an object in the room, or an object displayed on a screen of the head-wearable device.

The size of the given object should be sufficiently small and well defined in order to provide an unambiguous gaze target.

Accordingly, the co-ordinates and the direction of the given object in a co-ordinate system fixed with the head-wearable device and thus with the user's head is well enough defined to be considered as actual (or ground truth) values of the gaze point and gaze direction, respectively, of the user wearing the head-wearable device.

The user has an interest in improving the accuracy and robustness of the predictions of the trained NN, i.e. a NN which is trained using and thus depending on the quality of the datasets in the database.

In one embodiment, more than one gaze-related parameter, for example two or three gaze-related parameters are added with the dataset to the database in step 2500.

For example, instead or in addition to actual values or other representations of a cyclopean gaze direction, values or other representations of respective gaze directions of one or both eyes, of pupil axis orientations of one or both eyes, of a 3D gaze point, or of a 2D gaze point may be added with the dataset to the database in step 2500.

As indicated by the left and right dashed arrows in FIG. 3C, the method 2000 may return to step 2100 for presenting a further stimulus or even the same stimulus again. Note that several datasets may be added in step 2500.

Presenting the same stimulus may be useful for statistical reasons, to obtain datasets under different conditions, for example for a fresh and a tired user or at different times and/or light conditions.

Furthermore, the stimulus may not be one-to-one related with the resulting value of the gaze-related parameter(s).

For example, the user may hold the finger in different positions with respect to the device defined co-ordinate system when requested to gaze at a tip of one of his fingers held in his FOV. Although the fingertip defines inter alia a respective resulting gaze direction relative to the co-ordinate system fixed with the head-wearable device, the actual value of the resulting gaze direction to be stored in the database may yet have to be determined. In these embodiments, a gaze-related parameter determination unit, for example a gaze-related parameter determination unit including a scene camera arranged to capture the given object in the field of view of the user, typically a scene camera of the head-wearable device, may be used to determine an actual value of the gaze-related parameter, for example a resulting gaze direction and/or the respective resulting gaze point of the user.

Based on the image(s) of the scene camera, the actual value(s) of the gaze-related parameter may be determined using known machine learning, computer vision or image processing techniques. This may be done locally, i.e. using one or more processors of a processing unit of the head-wearable device or of a typically more powerful local computer connected with the head-wearable device or using one or more processors of a typically even more powerful computing system also hosting the database. In the latter case, the dataset(s) may include the image(s) of the scene camera as representations of the gaze-related parameter(s).

Method 2000 may be used to generate, provide, apply, and/or improve a so-called "universal neural network" (also referred to as universal NN-model and "cross-user NN-model") for determining ocular parameters (eye parameters), in particular gaze direction information of users. Such a universal NN is in its basic embodiment suitable for application as is, without any further calibration or setup steps by a "new" user, meaning a user whose datasets have not been used to train the NN.

It is thus assumed, that a so-called core data corpus of labelled datasets has been collected and stored in a database DB and a learning algorithm based on NNs has been trained based on said data.

The core data corpus can for example consist of datasets of image pairs picturing (respective portions of) the left and right eye, corresponding ground truth gaze points in scene camera image coordinates and respective portions of the non-transparent component.

The core data corpus typically covers a large variety of naturally occurring appearances of the eyes. Thus, while recording training data special care may be taken to cover the entirety of possible appearance ranges of the eye images. This way it is made sure that the universal NN will work robustly on all images occurring in practice.

Factors that for example may be covered are different lighting conditions (in particular also outdoor lighting conditions), different poses of the headset (head-wearable device) on the user's head (to reflect headset slippage), differences in the physiological appearance of the user induced by for example gender or affiliation with an ethnic group, short-term physiological changes (e.g. on one day a user's eyes are more swollen or widely opened compared to another) and distance between gaze target and user as will be described in the following (different gaze distances lead to different levels of vergence of the eyes). Furthermore, the ground truth gaze points should correspond to objects at different distances from the user, to ensure that also a variety of different states of binocular vergence is present in the data corpus.

In addition, data augmentation methods may be used in order to further diversify the core data corpus and increase the amount of available data.

To further augment the amount of slippage configurations of the headset on a given user, slippage simulation has been found to be beneficial. Given a pair of eye images of the left and right eye together with the ground truth gaze label for that pair, samples of random movements which the headset might undergo due to slippage are generated. Given these movements and the fixed geometric relations between all cameras in the headset, projective transformations that produce the effect implied by the movements can be calculated. This way, valid additional samples of labelled datasets can be calculated without having to actually record them.

Similarly, random erasing in which randomly chosen regions in an image are erased and the corresponding pixels replaced with random values or a mean image pixel value produces images with various levels of simulated occlusion which can serve as additional "artificial" training datasets, which comes at no additional cost but adds to the diversity of the core data corpus.

A universal NN trained on such a core data corpus has then learned to produce or predict an output which encodes an ocular parameter, such as the gaze direction of any user. In one possible example, the output is given as 2D pixel coordinates of the gaze point in the scene camera image. Other encodings like for example the 3D location of the gaze point in some 3D coordinate system; or the 3D gaze ray in eye camera coordinates can be implemented as well.

In preferred embodiment, the system is binocular, i.e. its cameras capture (the state of) both eyes. A binocular capture is important (necessary in most cases) to determine the exact location of the 3D gaze point, which can only be inferred from the binocular vergence of the eyes. With a monocular system one can only infer the 3D gaze direction of the user, but one cannot infer the precise depth of the gaze point. Given the 3D gaze direction one could also compute the exact gaze location by intersecting the gaze ray with the world geometry, assuming this geometry is known.

As to the NN model to be trained for use in the system and methods of the present disclosure, it has been surprisingly found that Convolutional Neural Networks (CNNs) are able to yield sufficient accuracy, despite the inherently challenging mobile respectively wearable setup of the device, which leads to low resolution of the input images and the challenging viewpoint of the unobtrusively placed optical sensor(s).

While CNNs have been used for tasks like object recognition where this can be beneficial, their use in end-to-end gaze prediction in a mobile setting has not previously been attempted. Given the great variety in image appearance in such a setting, leading to images which do not even always show the pupil or only show small fractions of the pupil, with large variations in lighting conditions and skin tone, it is unexpected that CNNs should be trainable to learn sufficiently meaningful convolution kernels to provide a universal cross-user model for accurate gaze prediction based on merely two low resolution input images.

By exploiting the use of CNNs in a mobile respectively wearable eye tracking setup, according to an important aspect of the present disclosure, a more unobtrusive device design and a more robust cross-user gaze detection is thus enabled (for example a mean angular prediction error lower than 2°).

The exact internal architecture of the network, i.e. the exact number, dimensions and sequence of convolutional and other layers has been found not to be very critical for the systems to work sufficiently well.

However, the network should preferably be highly efficient in order to allow for real-time interaction and embedded computation. Similarly, the precise individual values of the parameters which result from the training process influence the final accuracy of the trained network only to a small degree.

In particular network architectures optimized for small size or execution on mobile or embedded platforms have been found to be suitable. Candidates using CNNs thus include but are not limited to LeNet, SqueezeNet, Mobile-Net, Darknet, Resnet18 and any adaptations of these. Such network architectures are generally known and therefore need not be further described here in detail.

In a preferred embodiment, the neural network additionally uses one or more so-called "squeeze—and—excitation" (SE) blocks (layers). Such blocks perform feature recalibration. Input data or features U (W×H×C corresponding to image width×image height×number of channels) are first passed through a squeeze operation, which aggregates the feature maps across spatial dimensions W×H to produce a channel descriptor (1×1×C). This descriptor embeds the global distribution of channel-wise feature responses, enabling information from the global receptive field of the network to be leveraged by its lower layers. This is followed by an excitation operation, in which sample-specific activations, learned for each channel by a self-gating mechanism based on channel dependence, govern the excitation of each channel. The feature maps U are then reweighted channel-wise by these additionally learned parameters to generate the output of the SE block which can then be fed directly into subsequent layers.

Once, a core data corpus has been created and a CNN has been trained using the database DB (and the methods herein described), the parameters {tCNN} of the trained convolutional neural network tCNN can be uploaded to the memory of the head-wearable device.

According to an embodiment of a training database (DB) obtainable by the method for creating and updating a database as explained herein, the training database includes a plurality of datasets. Some of the datasets include a respective first representation of a gaze-related parameter, in particular a gaze-direction related parameter, a corresponding respective first image showing a first eye of a first user and at least a portion of a non-transparent component of a head-wearable device, and optionally a second image showing a second eye of the first user and at least another portion of the non-transparent component of the head-wearable device.

Typically, the training database includes respective datasets for several users and/or several head-wearable devices.

The training database may be used for training NNs.

With regard to FIG. 3D, a method 3000 for training a neural network is explained.

In a step 3100, a database DB created and/or updated as explained above with regard to FIG. 3C is provided. The database DB has a plurality of datasets each having a respective image showing at least a portion of a first eye of a respective user, a respective portion of a non-transparent component of a head-wearable device, a respective corresponding representation of one or more gaze-related parameters, in particular respective corresponding value(s) of the gaze-related parameter(s), and optionally a respective further image showing at least a portion of a second eye of the respective user and a respective further portion of the non-transparent component of the head-wearable device.

Further, a neural network NNW with a given network architecture is provided in a step 3200. The provided neural network NNW is typically a convolutional NN.

The provided neural network NNW may be a previously trained NN.

Alternatively, the parameters (weights) of the provided neural network NNW may have been initialized with random values.

In a step 3300, parameters of the neural network are amended using the respective image(s) of a sub-set or of all datasets as input and the respective corresponding representations of the gaze-related parameter(s) of the sub-set or of all datasets as desired output of the neural network.

Step 3300 may include many teaching cycles each of which uses one or more datasets of the database DB.

Typically, a deep learning technique, in particular a gradient descent technique such as backpropagation may be used to train the neural network NNW in step 3300.

Finally, a trained or retrained neural network tNNW may be output and/or stored.

In particular, the determined weights of tNNW may be stored and typically later transferred to a processing unit of a head-wearable device or a companion device connectable with a head-wearable device.

More typically, the determined weights of tNNW are (later) transferred to a plurality of respective processing units and/or head-wearable devices.

Thereafter, one or more local instances of the trained neural network tNNW may be used to predict eye parameters(s), in particular gaze-related parameter(s) of a respective user, when the user is wearing a head-wearable device, from left and right images generated by the respective cameras of the head-wearable device, typically in real-time.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

While processes may be depicted in the figures in a particular order, this should not be understood as requiring, if not stated otherwise, that such operations have to be performed in the particular order shown or in sequential order to achieve the desirable results. In certain circumstances, multitasking and/or parallel processing may be advantageous.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

REFERENCE NUMBERS

1 spectacles device
2 spectacles body
3 nose bridge portion
4 frame
5 illumination means
6 scene camera
7 computing unit/processing unit
8 left side
10 left ocular opening
11 left lateral portion
12 left holder
13 left camera
14 optical axis (left camera)
15
16 left inner eye camera placement zone
17 left outer eye camera placement zone
18 left eye
19
20 right side
21 right ocular opening
22 right lateral portion
23 right holder
24 right camera
25 optical axis (right camera)
26
27 right inner eye camera placement zone
28 left outer eye camera placement zone
29 right eye
30
30 bounding cuboid
31 left lateral surface
32 right lateral surface
33 upper surface
34 lower surface
35
100 middle plane
101 horizontal direction
102 vertical direction
103 down
104 up
105 front
106 back
$\alpha$ angle of inner left camera 14
$\beta$ angle of inner right camera 24
$\gamma$ angle of outer left camera 14
$\delta$ angle of outer right camera 24
$\epsilon$ vertical inclination angle of outer or inner left or right camera 14, 24
500 system
>=1000 methods, method steps

The invention claimed is:

1. A system for determining one or more parameters of a user's eye, the system comprising:
a head-wearable device comprising a first camera comprising a field of view, and a non-transparent component, the first camera and the non-transparent component being arranged relative to each other so that at least a portion of the eye and at least a portion of the non-transparent component are in the field of view of the first camera when the user is wearing the head-wearable device; and
a computing unit implementing a neural network and configured to:
receive an image from the first camera, the image including at least the portion of the eye and the portion of the non-transparent component;
feed the image as an input into the neural network; and
determine the one or more parameters as an output of the neural network.

2. The system of claim 1, wherein the head-wearable device comprises a second camera which is arranged with respect to the non-transparent component so that at least a portion of a further eye of the user and at least a further portion of the non-transparent component are in a field of view of the second camera when the user is wearing the head-wearable device, and wherein the computing unit is configured to:
receive an image from the second camera;
feed the image as an input into the neural network or another neural network; and
determine one or more parameters of the further eye as an output of the neural network.

3. The system of claim 2, wherein a pose of at least one of the first camera and the second camera is adjustable, fixable and/or fixed with respect to the non-transparent component.

4. The system of claim 1, wherein the non-transparent component is a main body of the head-wearable device, a nose bridge portion of the head-wearable device or a frame of the head-wearable device.

5. The system of claim 2, wherein the each of the first and second cameras is arranged on the inner side of a frame of the head-wearable device, directly facing the user's eye such that a shortest optically possible path between the outer border of the eye and the outer border of the camera forms a straight line only intersecting air when the user is wearing the head-wearable device, wherein the respective camera is arranged in the nose bridge portion of the head-wearable device, and/or orientated within a range of 32 to 40, preferably, 34 to 38, in particular 36 degrees with respect to the median plane of the head-wearable device, and/or wherein the respective camera is arranged in a lateral portion of the head-wearable device, and/or located within a range of 108 to 125 degrees with respect to the median plane of the head-wearable device.

6. The system of claim 1, wherein the one or more parameters comprise a gaze-direction related parameter, a gaze-related parameter and/or selected from a list consisting of: a gaze direction, a cyclopean gaze direction, a 3D gaze point, a 2D gaze point, a visual axis orientation, an optical axis orientation, a pupil axis orientation, a line of sight orientation, an orientation and/or a position and/or an eyelid closure, a pupil area, a pupil size, a pupil diameter, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a flat and/or a steep axis, a limbus major and/or minor axes orientation, an eye cyclo-torsion, an eye intra-ocular distance, an eye vergence, a statistics over eye adduction and/or eye abduction, and a statistics over eye elevation and/or eye depression, data about blink events, drowsiness and/or awareness of the user, parameters for user iris verification and/or identification.

7. The system of claim 1, wherein the image is not pre-processed to obtain spatial and/or temporal patterns or arrangements prior to feeding it to the neural network, and/or wherein the image does not undergo feature extraction prior to feeding it to the neural network.

8. The system of claim 1, wherein the output of the neural network is not post-processed for determining the one or more parameters, wherein the neural network comprises a two-dimensional input layer, wherein the respective image has a resolution of N×N pixels, and/or wherein the input layer is a N×N matrix or a N×2N matrix, wherein N is smaller or equal than 384, wherein the neural network comprises input nodes and/or an input layer for receiving values referring to at least one of a type of the camera, camera intrinsics of the camera, camera extrinsics of the camera, a type of the head-wearable device, and a size measure of or a deformation information about the head-wearable device, and/or wherein the neural network comprises at least one convolutional layer.

9. The system of claim 1, wherein the computing unit is at least partly integrated into the head-wearable device and/or at least partly provided by a companion device of the system, in particular a mobile companion device.

10. The system of claim 1, wherein the computing unit comprises:
   one or more processors, in particular one or more CPUs, GPUs and/or DSPs; and
   a neural network module comprising instructions which, when executed by at least one of the one or more processors, implement an instance of the neural network.

11. A method for determining one or more parameters of a user's eye, the method comprising:
   providing a head-wearable device comprising a first camera comprising a field of view, and a non-transparent component, the first camera and the non-transparent component being arranged relative to each other so that at least a portion of the eye and at least a portion of the non-transparent component are in the field of view of the first camera when the user is wearing the head-wearable device;
   creating an image using the first camera of the head-wearable device worn by the user;
   feeding the image as an input into a neural network, the image including at least the portion of the eye and the portion of the non-transparent component; and
   determining the one or more parameters as an output of the neural network.

12. The method of claim 11, wherein the head-wearable device comprises a second camera which is arranged with respect to the non-transparent component so that at least a portion of a further eye of the user and at least a further portion of the non-transparent component are in a field of view of the second camera when the user is wearing the head-wearable device, further comprising:
   creating an image using the second camera of the head-wearable device worn by the user; and
   feeding the image as an input into the neural network.

13. The method of claim 11, wherein the image is not pre-processed to obtain spatial and/or temporal patterns or arrangements prior to feeding it to the neural network, wherein the respective image does not undergo feature extraction prior to feeding it to the neural network, and/or wherein the output of the neural network is not post-processed for determining the one or more parameters.

14. The method of claim 11, wherein, in addition to the image, at most data referring to a type of the camera, camera intrinsics of the camera, camera extrinsics of the camera, a type of the head-wearable device, and a size measure of or a deformation information about the head-wearable device is fed as an input into the neural network.

15. A method for creating and updating a database for training a neural network, in particular a convolutional neural, the method comprising:
   presenting a first stimulus to a first user wearing a head-wearable device, the head-wearable device comprising a non-transparent component and a first camera arranged next to a first eye of the first user;
   using the first camera of the head-wearable device to generate, when the first user responds to the first stimulus, a first image of at least a portion of the first eye of the first user and at least a portion of the non-transparent component;
   establishing a data connection between the head-wearable device and the database;
   generating a first dataset comprising the first image and a first representation of a gaze-related parameter, the first representation being correlated with the first stimulus; and
   adding the first dataset to the database.

16. The method of claim 15, the head-wearable device including a second camera arranged next to a second eye of the first user when the first user is wearing the head-wearable device, the method further comprising:
   using, when the first user responds to the first stimulus, the second camera of the head-wearable device to generate a second image of at least a portion of the second eye of the first user and another portion of the non-transparent component, the first dataset further comprising the second image;
   presenting a second stimulus to the first user wearing the head-wearable device;
   using the first camera of the head-wearable device to generate, when the first user responds to the second stimulus, a third image of at least a portion of the first eye of the first user and at least the portion of the non-transparent component, and when the first user responds to the second stimulus, using the second camera of the head-wearable device to generate a fourth image of at least a portion of the second eye of the first user and the other portion of the non-transparent component;

establishing a data connection between the head-wearable device and the database;

generating a second dataset comprising the third image and the fourth image, and a second representation of the gaze-related parameter, the second representation being correlated with the second stimulus; and adding the second dataset to the database.

17. The method of claim 15, further comprising at least one of:

all of the following four steps:
  presenting a third stimulus to a second user wearing the head-wearable device;
  using the first camera of the head-wearable device to generate, when the second user responds to the third stimulus, a fifth image of at least a portion of a first eye of the second user and at least a portion the a non-transparent component, and when the second user responds to the third stimulus, using the second camera of the head-wearable device to generate a sixth image of at least a portion of a second eye of the second user and another portion of the non-transparent component;
  generating a third dataset comprising the fifth image and the sixth image, and a third representation of the gaze-related parameter, the third representation being correlated with the third stimulus; and
  adding the third dataset to the database, and all of the following five steps:
  presenting a fourth stimulus to the first user or the second user wearing a further head-wearable device comprising a non-transparent component and a first camera arranged next to a first eye of the user and a second camera arranged next to a second eye of the user when wearing the further head-wearable device;
  using the first camera of the further head-wearable device to generate, when the user responds to the fourth stimulus, a seventh image of at least a portion of the first eye of the respective user and at least a portion the non-transparent component of the further head-wearable device, and when the respective user responds to the fourth stimulus, using the second camera of the further head-wearable device to generate an eighth image of at least a portion of a second eye of the respective user and another portion of the non-transparent component of the further head-wearable device;
  establishing a data connection between the further head-wearable device and the database;
  generating a fourth dataset comprising the seventh image, the eighth image, and a fourth representation of the gaze-related parameter, the fourth representation being correlated with the fourth stimulus; and
  adding the fourth dataset to the database.

18. The method of claim 15, further comprising:
using the first camera of the head-wearable device to generate a further image of at least a portion of the first eye of the user and at least the respective portion of the respective non-transparent component, and using the second camera of the head-wearable device to generate yet a further image of at least a portion of the second eye of the user and at least the portion of the respective non-transparent component;
generating a further dataset comprising the further image and the yet further image; and
adding the further dataset to the database.

19. The method of claim 15, wherein establishing the data connection comprises connecting the head-wearable device with at least one of a desktop computer, a tablet, a laptop, a server, and a smartphone.

20. The method of claim 15, wherein the stimulus comprises a visual stimulus, and/or wherein the stimulus comprises an acoustical stimulus, wherein the user is caused by acoustic stimulus to gaze at an object defining a gaze direction relative to a co-ordinate system fixed with the head-wearable device and/or a gaze point in the co-ordinate system, and/or wherein an image or a pair of images are generated when the user gazes at the object into the gaze direction and/or at the gaze point.

21. A system for determining one or more parameters of a user's eye, the system comprising:
  a head-wearable device including a non-transparent component and at least a first camera having a field of view, the first camera and the non-transparent component arranged relative to each other so that at least a portion of the eye and at least a portion of the non-transparent component are in the field of view of the first camera when the user is wearing the head-wearable device, wherein the head-wearable device is implemented as a one of a spectacles device, an augmented reality device and a virtual reality device; and
  a computing unit implementing a neural network and configured to:
  receive an image from the first camera, the image including at least the portion of the eye and the portion of the non-transparent component;
  feed the image as an input into the neural network; and
  determine the one or more parameters as an output of the neural network.

22. The system of claim 21, wherein the neural network is trained to take into account the portion of the eye with respect to the portion of the non-transparent component in the image to determine the one or more parameters of the user's eye.

* * * * *